(12) United States Patent
Hoekstra et al.

(10) Patent No.: US 9,579,635 B2
(45) Date of Patent: Feb. 28, 2017

(54) CARBON BODIES AND FERROMAGNETIC CARBON BODIES

(71) Applicant: BASF CORPORATION, Florham Park, NJ (US)

(72) Inventors: Jacobus Hoekstra, De Meern (NL); Jim Aloysius Maria Brandts, De Meern (NL); Lorianne Wagemaker, De Meern (NL); John Wilhelm Geus, De Meern (NL); Leonardus Wijnand Jenneskens, De Meern (NL)

(73) Assignee: BASF CORPORATION, Florham Park, NJ (US)

( * ) Notice: Subject to any disclaimer, the term of this patent is extended or adjusted under 35 U.S.C. 154(b) by 0 days.

(21) Appl. No.: 14/651,937

(22) PCT Filed: Dec. 12, 2013

(86) PCT No.: PCT/IB2013/060863
§ 371 (c)(1),
(2) Date: Jun. 12, 2015

(87) PCT Pub. No.: WO2014/091447
PCT Pub. Date: Jun. 19, 2014

(65) Prior Publication Data
US 2015/0328621 A1    Nov. 19, 2015

(30) Foreign Application Priority Data
Dec. 13, 2012  (EP) .................................... 12197061

(51) Int. Cl.
*B01J 23/75*    (2006.01)
*C07C 1/00*    (2006.01)
(Continued)

(52) U.S. Cl.
CPC ............. *B01J 23/745* (2013.01); *B01J 20/02* (2013.01); *B01J 20/06* (2013.01); *B01J 20/20* (2013.01);
(Continued)

(58) Field of Classification Search
CPC ........ B01J 23/745; B01J 23/75; B01J 23/755; B01J 35/1019; B01J 35/1023;
(Continued)

(56) References Cited

U.S. PATENT DOCUMENTS 3,259,589 A    7/1966  Michalko
3,388,077 A    6/1968  Hoekstra
(Continued)

FOREIGN PATENT DOCUMENTS

EP    2 383 374    2/2011
JP    H10297912    11/1998
(Continued)

OTHER PUBLICATIONS

"A facile route to carbon-coated nickel-based metal nanoparticles," Guo-Xing Zhu et al. J. Mater. Chem., 2007, 17, pp. 2301-2306.*
(Continued)

*Primary Examiner* — Patricia L Hailey
(74) *Attorney, Agent, or Firm* — Lowenstein Sandler LLP

(57) ABSTRACT

The invention is in the field of modified carbon products. More in particular, the invention is in the field of graphitized activated carbon bodies. The invention is directed to carbon bodies and ferromagnetic carbon bodies, the production of these bodies from activated carbon, and the applications of the carbon bodies and ferromagnetic carbon bodies, for instance in water treatment and in electrochemical applications.

22 Claims, 17 Drawing Sheets

(51) Int. Cl.

| | | |
|---|---|---|
| B01J 23/745 | (2006.01) | |
| B01J 21/18 | (2006.01) | |
| B01J 31/06 | (2006.01) | |
| B01J 35/02 | (2006.01) | |
| B01J 35/10 | (2006.01) | |
| B01J 35/00 | (2006.01) | |
| B01J 37/02 | (2006.01) | |
| B01J 37/08 | (2006.01) | |
| B01J 37/16 | (2006.01) | |
| H01F 41/02 | (2006.01) | |
| B01J 20/20 | (2006.01) | |
| H01F 1/00 | (2006.01) | |
| H01F 1/28 | (2006.01) | |
| B01J 20/28 | (2006.01) | |
| B01J 20/02 | (2006.01) | |
| B01J 20/06 | (2006.01) | |
| B01J 20/30 | (2006.01) | |
| B01J 20/32 | (2006.01) | |
| C02F 1/28 | (2006.01) | |
| C02F 1/48 | (2006.01) | |

(52) U.S. Cl.
CPC ....... *B01J 20/205* (2013.01); *B01J 20/28009* (2013.01); *B01J 20/28057* (2013.01); *B01J 20/28069* (2013.01); *B01J 20/28083* (2013.01); *B01J 20/3007* (2013.01); *B01J 20/3078* (2013.01); *B01J 20/3204* (2013.01); *B01J 20/3268* (2013.01); *B01J 21/18* (2013.01); *B01J 21/185* (2013.01); *B01J 31/06* (2013.01); *B01J 35/0033* (2013.01); *B01J 35/026* (2013.01); *B01J 35/1019* (2013.01); *B01J 35/1023* (2013.01); *B01J 35/1038* (2013.01); *B01J 35/1042* (2013.01); *B01J 35/1061* (2013.01); *B01J 37/0201* (2013.01); *B01J 37/082* (2013.01); *B01J 37/16* (2013.01); *C02F 1/288* (2013.01); *H01F 1/0063* (2013.01); *H01F 1/28* (2013.01); *H01F 41/0266* (2013.01); *B01J 2231/62* (2013.01); *B01J 2531/002* (2013.01); *B01J 2531/008* (2013.01); *C02F 1/281* (2013.01); *C02F 1/283* (2013.01); *C02F 1/488* (2013.01); *C02F 2305/08* (2013.01); *Y10T 428/2982* (2015.01)

(58) Field of Classification Search
CPC  B01J 35/1038; B01J 35/1042; B01J 35/1061; B01J 31/06; B01J 37/021; B01J 37/082; B01J 37/16; B01J 37/18; B01J 21/185; C07C 1/00; C07C 1/043; C07C 1/044
USPC ....................... 502/185; 585/638; 252/62.55; 428/742.3, 403
See application file for complete search history.

(56) References Cited

U.S. PATENT DOCUMENTS

| 4,176,038 A | 11/1979 | Moeglich |
|---|---|---|
| 4,236,991 A | 12/1980 | Backhurst et al. |
| 4,783,434 A | 11/1988 | Wigman et al. |
| 2004/0065619 A1* | 4/2004 | Klabunde ............. B01D 53/02 210/681 |
| 2010/0291167 A1 | 11/2010 | Iida et al. |
| 2013/0157055 A1* | 6/2013 | Jenneskens ........... B22F 1/0018 428/403 |

FOREIGN PATENT DOCUMENTS

| JP | 2008527119 | * | 7/2008 |
|---|---|---|---|
| JP | 2010100516 | | 5/2010 |
| JP | 2011045874 | * | 3/2011 |
| JP | 2012519233 | | 8/2012 |
| SU | 1836145 | * | 8/1993 |
| WO | 2007131795 | | 11/2007 |
| WO | 2010098669 | | 8/2010 |
| WO | 2010098668 | | 9/2010 |
| WO | 2010109216 | * | 9/2010 |
| WO | 2011136654 | | 11/2011 |

OTHER PUBLICATIONS

Fernandez, M.P., et al., "Control of crystalline phases in magnetic Fe nanoparticles inserted inside a matrix of porous carbon," Journal of Magnetism and Magnetic Materials, 2010, pp. 1300-1303, vol. 322.

Halem, D., et al., "Arsenic in drinking water a worldwide water quality concern for water supply companies," Drinking Water Engineering and Science, 2009, pp. 29-34, vol. 2.

Hines, D., et al., "Surface Properties of Porous Carbon Obtained from Polystyrene Sulfonic Acid-Based Organic Salts," American Chemical Society, published on web Mar. 16, 2004, pp. 3388-3397, vol. 20.

International Preliminary report on Patentability for PCT/IB2013/060863 dated May 12, 2015, 22 pgs.

Ngene, P., et al., "The role of Ni in increasing the reversibility of the hydrogen release from nanoconfined LiBH4," Faraday Discussion, The Journal of The Royal Society of Chemistry, published on May 9, 2011, pp. 47-58, vol. 151.

Racyte, J., et al., "Combining fluidized activated carbon with weak alternating electric fields for disinfection," Carbon, 2011, pp. 5321-5328, vol. 49.

Scarlett, V.Y., et al., "Quantification of phases with partial or no known crystal structures," Powder Diffraction, 2006, pp. 278-284, vol. 21.

Wang, Z., et al., "A facile co-gelation route to synthesize FeCo/carbon nanocomposites and their application as magnetically separable adsorber," Journal of Alloys and Compounds, 2011, pp. 585-589, vol. 509.

Written Opinion of the International Examining Authority for PCT/IB2013/060863 dated Jan. 26, 2015, 9 pgs.

Li, Xiao-Qin, et al., "Suquestration of Metal Cations with Zerovalent Iron Nanoparticles—A Study with High Resolution X-ray Photoelectron Spectroscopy (HR-XPS)," J. Phys. Chem C, 2007, pp. 6939-6946, vol. 111, Center for Advanced Materials and Nanotechnology, Department of Civil and Environmental Engineering, Lehigh University, Bethlehem, PA.

Van Den Berg, "Synthesis of Highly Dispersed Zirconia-Supported Iron-Based Catalysts," PhD Thesis, 2001, 14 pgs., Utrecht University, The Netherlands.

Zhang, Li, et al., "Synthesis of nanoporous carbons by an in situ template approach," Journal of Materials Science, Jan. 2007, pp. 3692-3694, vol. 42, School of Materials Science and Engineering, Shanghai Jiao Tong University, Shanghai, China.

Zhuang, Y.Q., et al., "Novel synthesis route for egg-shell, egg-white and egg-yolk type of cobalt on silica catalysts," Applied Catalysis A: General, 2006, pp. 138-142, vol. 301, Catalysis Research Unit, Department of Chemical Engineering, University of Cape Town, Private Bag, Rondebosch, South Africa.

* cited by examiner

CARBON BODIES AND FERROMAGNETIC CARBON BODIES

CROSS REFERENCE TO RELATED APPLICATIONS

This application is a National Phase Application of PCT International Application No. PCT/IB2013/060863, filed on Dec. 12, 2013, claiming priority of European Patent Application No. 12197061.0, filed Dec. 13, 2012, which is hereby incorporated by reference in its entirety.

FIELD OF INVENTION

The invention is in the field of modified carbon products. More in particular, the invention is in the field of partly graphitized activated carbon bodies.

DETAILED DESCRIPTION

Figure 1:
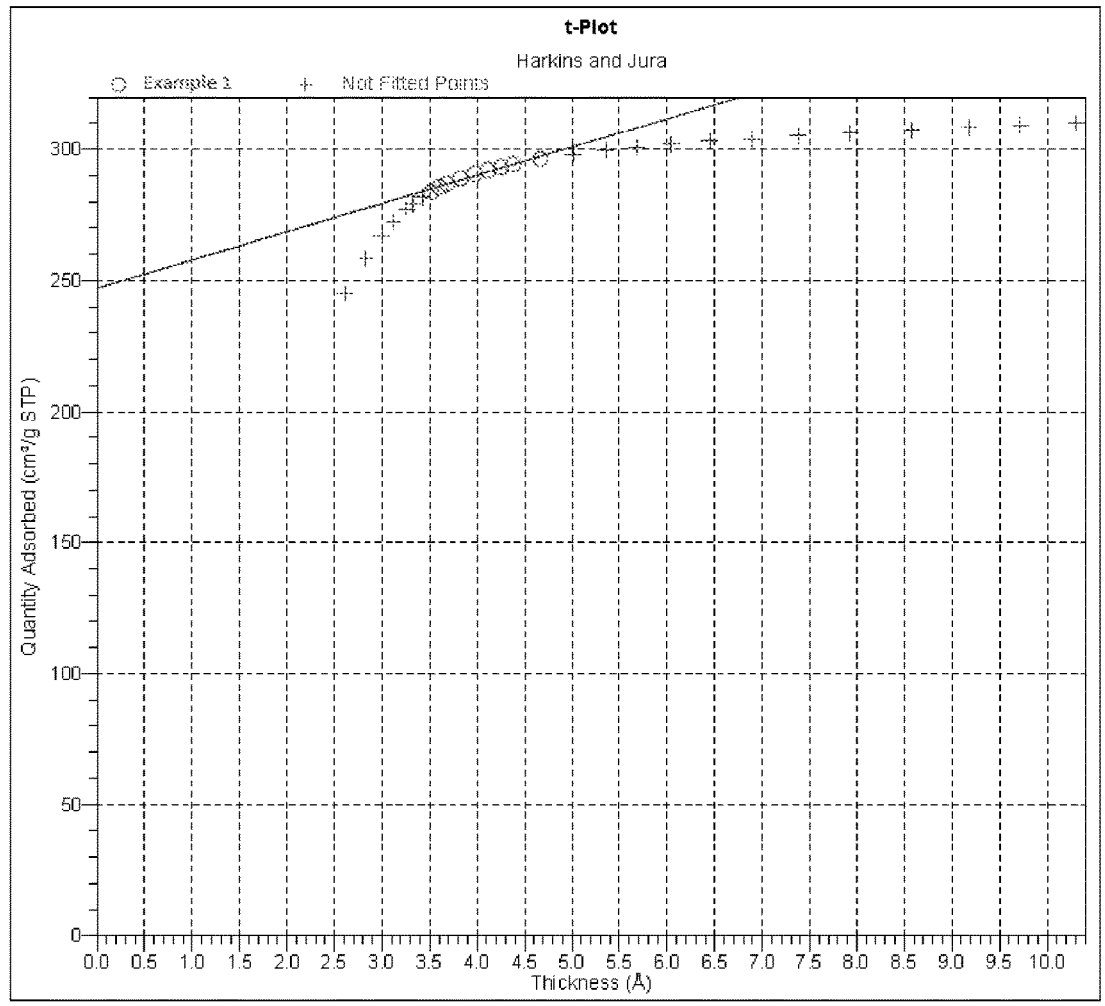
FIG. 1 shows a t-plot measurement of a first example extrudate.

The invention is directed to carbon bodies and ferromagnetic carbon bodies, the production of these bodies from activated carbon, and the applications of the carbon bodies and ferromagnetic carbon bodies, for instance in water treatment and in electrochemical applications.

Activated carbon is commonly used as an adsorbent to remove undesired compounds and ionic species from liquid or gas flows in the field and in industrial processes. Such uses include oil spill cleanup, groundwater treatment, drinking water purification, air purification and the removal of volatile organic compounds from numerous processes, such as dry cleaning and gasoline dispensing operations.

Activated carbon is also the preferred means for the treatment of surface sourced drinking water and contaminated ground water in Europe. Activated carbon has been used to improve the quality of drinking water by removing, for instance, taste and odour forming compounds, pesticides, colour, trihalomethanes, algal toxins and chlorinated hydrocarbons.

Humic and fulvic acids are organic compounds known to be a cause of unpleasant taste and colour of drinking water. Humic and fulvic acids are decomposition products of natural and agricultural material and are soluble in water at any $pH \geq 1$. Humic and fulvic acids can be removed from drinking water using activated carbon. The disadvantage with current processes is that the activated carbon is rapidly saturated. This is because particularly the humic acid molecules are usually too big for the narrow pores characteristic of unmodified activated carbon.

Arsenic contamination is a more serious concern in ground water supplies for human drinking water. The United States Environmental Protection Agency (U.S. EPA) describes arsenic as toxic to human health and has classified it as a carcinogen.

Halem et al. (Drinking Water Engineering and Science 2(2009)29-34), report that the World Health Organization has estimated that long-term exposure to arsenic in groundwater, at concentrations over 500 µg/L, causes death in 1 in 10 adults. Other studies show that problems with arsenic in groundwater/drinking water occur in many more countries worldwide, such as in the USA and China. In Europe it is described that the focus on arsenic problems is currently confined to countries with high arsenic levels in their groundwater, such as Serbia, Hungary and Italy. In most other European countries, it is reported that the naturally occurring arsenic concentrations are mostly lower than the European drinking water standard of 10 µg/L.

Arsenic is not easily dissolved in water, and therefore, if it is found in a water supply, it usually comes from mining or metallurgical operations or from runoff from agricultural areas where materials containing arsenic were used as industrial poisons. Further, arsenic and phosphate easily substitute for one another chemically. In inorganic form arsenic can be removed or reduced by conventional water treatment processes. Activated carbon is one of the known means of removing arsenic from drinking water. However, filtration through activated carbon has been reported to only reduce the amount of arsenic in drinking water by 40-70%.

Activated carbon removes contaminants from drinking water by two principal mechanisms which are adsorption and catalytic reduction.

Activated carbon is typically used in rapid gravity filters, fixed beds, slurries, filters and mobile and fixed pressure rated adsorbers. Activated carbon can be used in the form of a powder, particles, granules and shaped bodies, such as spheres, extrudates or tablets.

Although the intrinsic adsorptive properties of activated carbon are attractive, particularly the high capacity, activated carbon is often not employed to clean water flows from contaminants present at higher concentrations. The reason is that the activated carbon is rapidly saturated, which reduces the lifetime of use. Drinking water is consequently often purified in thin fixed beds of sand or iron oxide of a very large cross-sectional surface area to allow one to purify a water flow at a relatively very low flow rate. There is therefore a need to improve upon the properties of activated carbon for use in water purification.

Activated carbon is also a preferred support for precious metal catalysts, since the precious metal can be easily reclaimed by combustion of the carbon and is stable in acidic and alkaline liquids. A drawback of activated carbon is the liability to oxidation. A further drawback is that the activated carbon support is prone to attrition. Attrition typically leads to the loss of the precious metal and contamination of the reaction products. Loss of the precious metals with the reaction products is generally not acceptable in view of the high price of precious metals. Therefore, a more stable carbon catalyst support, such as one comprising graphitic carbon, would be very attractive. Partial conversion of the activated carbon into graphitic carbon would therefore be highly attractive.

Activated carbon has also many desirable properties for use in electrochemical applications, such as in fluidized bed electrodes and other cell components for batteries.

U.S. Pat. No. 4,236,991 and U.S. Pat. No. 4,176,038 reported the use of fluidized bed electrodes in electrochemical reactions to purify water flows from metal ions. The disadvantage of these systems, however, was that it was difficult to prevent segregation of the fluidized beds in dead sections of the electrolysis cell. Further, neither document mentioned that activated carbon may be used in the fluidized bed electrodes.

In a recent publication by Racyte et al. (Carbon 49(2011) 5321-5328), activated carbon was used in fluidized bed electrodes for the disinfection of water. In this system, granular activated carbon particles were suspended, and an alternating radio frequency electric field was applied over the suspended bed. The disadvantage of this system is that it required mechanical agitation via a stirring bar to prevent the granulated activated carbon particles from settling. Therefore, activated carbon which does not settle when used in fluidized bed electrodes would be very attractive.

Typically activated carbon is produced from carbonaceous source materials such as nutshells, peat or wood and consists almost essentially (e.g. >99 wt. %) of amorphous carbon. The surface area of activated carbon as measured and calculated by the BET method is extremely high. BET surface area values above 1000 $m^2$ per gram have been reported for activated carbon. However, an appreciable drawback of such an extensive surface area is that it is only accessible through narrow pores. Whereas with gas flows the transport through the narrow pores can still be sufficiently rapid, the rate of transport of a liquid in narrow pores is low; the reason is that diffusion coefficients in liquids are about a factor of $10^4$ smaller than diffusion coefficients in the gas phase. The slow transport of liquid through the porous structure of activated carbon is a considerable problem in many applications. Larger molecules, i.e., those of the humic acids are too big to enter the narrow pores and adsorb onto the outer surface of activated carbon bodies, leading to pore blockage and a subsequent loss of adsorption capacity for smaller molecules.

Most important for the rate of transport, in particular with liquids, is the length of the pores, which is determined by the size of the bodies of activated carbon used. Smaller sized carbon bodies typically provide shorter pores. In a fixed bed, the bodies of activated carbon used as an adsorbent should not be too small, since this would result in too high a pressure drop across the bed. A minimum size for the bodies of activated carbon to be employed in fixed beds is typically about 2 to 10 mm. However, the size limitation of the bodies of activated carbon used in a slurry is much smaller, and may typically be about 10 μm. This limitation is determined by the requirements of separating the activated carbon by either filtration or centrifugation.

In spite of the fact that the length of the pores affects the rate of transport more strongly than the diameter of the pores, utilization of pores with a larger diameter can also raise the transport rate considerably. However, the mean diameter of the pores in activated carbon is normally very small.

Activated carbon bodies, as previously mentioned, often do not have sufficient mechanical strength to withstand attrition when used either as an adsorbent or as catalyst support. Further, freshly produced activated carbon is also hydrophobic and oleophilic. However, the surface of the activated carbon oxidizes upon exposure to atmospheric air and becomes hydrophilic. There is therefore a need to provide carbon with stable hydrophobic properties.

WO-A-2011/136654 describes nano-particles containing graphitic carbon and a ferromagnetic metal or alloy suitable for use in clinical applications, such as magnetic resonance imaging (MRI). However, neither the total pore volume nor the BET surface area of these nano-particles is disclosed.

WO-A-2007/131795 describes the production of amorphous carbon bodies from microcrystalline cellulose. However, microcrystalline cellulose is relatively expensive, while only about 20% of the original weight of the microcrystalline cellulose remains after thermal treatment. Further, shaping and impregnation of other cellulosic materials is difficult and calls for admixing of a number of other constituents, which are often soluble in acid or alkaline environment and thus limit the stability of the carbon bodies. Therefore, the production of such porous carbon bodies is not attractive.

WO-A-2010/098668 describes the production of metal-carbon bodies in which the carbon is almost completely present as graphitic carbon.

US-A-2010/291167 describes a method for preparing a porous carbon material composite from plant derived materials. Further, US-A-2010/291167 describes impregnating plant derived materials with an aqueous solution of iron chloride and subsequently heating at a temperature of 750° C. Since iron chloride volatilizes during the heating step, the distribution of the iron content is not controlled resulting in the iron content being dispersed throughout the impregnated materials.

Journal of Magnetism and Magnetic Materials 322(2010) 1300-1303 describes preparing iron/carbon composite materials by impregnating activated carbon with a solution of iron nitrate in ethanol, drying and then heating at a temperature of 900° C.

Faraday Discussions 151(2011)47-58) describes carbon-supported nickel nano-particles produced by impregnating graphitic carbon with an aqueous solution of nickel nitrate, drying the impregnated carbon and calcining at a temperature of 450° C.

Journal of Alloys and Compounds 509(2011)585-589 describes the preparation of FeCo/carbon nanocomposites by co-gelation of furfuryl alcohol, metal nitrates and teraethylorthosilicate to form an inorganic/organic hybrid xerogel. This document further describes that the formed xerogel is carbonized at 900° C. and then etched with NaOH.

Langmuir 20(2004)3388-3397 describes pyrolyzing poly (styrene sulfonic acid-co-maleic acid) salts containing iron, cobalt and nickel at a temperature of 800° C. to produce materials consisting of porous carbon and metal species. Further, this document shows SEM images of the materials produced having a cardboard-like structure.

Journal of Materials Science 42(2007)3692-3694 describes the synthesis of carbon nanofibres using a template of iron nanoparticles in situ with the formation of carbon by chemical vapor decomposition of iron pentacarbonyl and ethanol and the removal of the template with acid.

However, controlling the conversion of activated carbon to graphitic carbon, such that the fraction and the location of the graphitic carbon are determined would be highly attractive. This is because graphitic carbon is and remains hydrophobic. Controlling the proportion of hydrophobic and hydrophilic surfaces would therefore provide an activated carbon body with interesting properties.

Accordingly, it is an object of the invention to provide a partly graphitized activated carbon body with improved properties, wherein the amount and location of the graphitic carbon can be controlled.

Surprisingly it has been found that impregnation of activated carbon with one or more compounds of metals capable of forming unstable metal carbides and pyrolyzing the impregnated activated carbon at an elevated temperature under an inert atmosphere leads to reduction of the metal compounds and a local recrystallization of the activated carbon to graphitic carbon. Metals typically capable of forming such unstable metal carbides include ferromagnetic metals such as iron, nickel and cobalt. The recrystallization of the activated carbon also leads to a drop in the BET surface area and a considerable growth in the average pore diameter.

In addition, it has been found that it is possible to control the conversion of the activated carbon to graphitic carbon by: the amount of metal compounds loaded into the activated carbon; and, the temperature used for pyrolysis. It has also been found that the location of graphitic carbon formed within the activated carbon body can be controlled by controlling the impregnation process, i.e., the location where the metals are deposited, which can be influenced by the impregnation process of the activated carbon bodies.

The invention is accordingly directed to a ferromagnetic carbon body comprising partly graphitized activated carbon and metal particles of at least one ferromagnetic metal, and wherein the body has a BET surface area of between 200 and 1000 $m^2/g$, a total pore volume of between 0.1 and 1 ml/g, and an average pore diameter of between 2 and 10 nm.

Surprisingly it has been found that the ferromagnetic carbon body according to the invention has an improved pore size distribution. The improved porous structure of the ferromagnetic carbon body enables transport to its large internal surface to proceed much more rapidly than that of unmodified activated carbon. This advantageously provides for a considerable increase of the adsorption capacity and the rate of removal of contaminants.

It is also surprising that the metal particles, and in particular the iron particles, resulting from the reduction of the metal precursor by the carbon are typically not encapsulated or only partly encapsulated by graphitic carbon. That part of the surface of the metal particles is still bare after the recrystallization of the carbon is evident from the fact that most of the metal particles can be removed (e.g. >90 wt. %) from the resulting carbon bodies by treatment with an acid, e.g., hydrochloric acid, nitric acid or sulphuric acid.

It is desirable that the dispersion of the impregnated metal compound throughout the activated carbon starting material is controlled.

Methods for controlling the dispersion and distribution of metal compounds in a support are known from the field of heterogeneous catalysis.

Zhuang et al. (Applied Catalysis A: General 301(2006) 138-142) describes methods for preparing egg-shell, egg-white and egg-yolk type supported metal catalysts with a sharp boundary. In the technique of Zhuang et al., an impregnation solution or a leaching solution is prevented from entering the core of the catalyst support, since the pore volume in the centre of the catalyst support is filled with a hydrophobic organic solvent. Zhuang et al. also describes that the amount of organic solvent in the catalyst support can be controlled by evaporation. Further, Zhuang et al. describes that this results in egg-shell type catalyst by inhibiting the impregnation solution entering the core of the catalyst support; in egg-yolk type catalyst by inhibiting the leaching solution entering the core of the reduced catalyst support; or in egg-white type catalyst by inhibiting the leaching solution entering the core of the reduced egg-shell type catalyst.

U.S. Pat. No. 3,259,589 describes a method of preparing catalysts by impregnating an inorganic oxide support with a catalytic active metal component and an organic acid, drying the impregnated support and then reducing the metal component by heating in the presence of hydrogen. U.S. Pat. No. 3,259,589 also describes that this method may be modified by not using an organic acid during the impregnation of the support, which results in a catalyst particle having virtually all the catalytically active metal component on or near the surface thereof (i.e. an egg-shell type catalyst). Further, U.S. Pat. No. 3,259,589 describes that using an excess amount of organic acid, results in virtually all of the metal component being forced into the center of the catalyst particle (i.e. an egg-yolk type catalyst). In another variation of this method, U.S. Pat. No. 3,259,589 describes that a catalyst particle having the metal component completely imbedded as a layer within the particle may be produced by using an organic acid having a hydroxyl group adjacent to the carboxylic group in an amount of 0.1 to 1.5 wt. %, based upon the weight of the support. The other variation of the method described in U.S. Pat. No. 3,259,589 is that a catalyst particle may be prepared having the metal component homogeneously distributed throughout the support by using an organic acid in an amount from 0.1 to 1.5 wt. %, based on the weight of the support, in the presence of ammonia or other alkalinous-acting material.

U.S. Pat. No. 3,388,077 describes similar methods of preparing a catalyst as U.S. Pat. No. 3,259,589, with the exception that an alkaline earth metal component is also impregnated into the support.

Van den Berg ("Zirconia-supported iron-based Fischer-Tropsch catalysts", PhD Thesis (2001) Utrecht University, The Netherlands) describes a method of producing highly dispersed zirconia-supported iron-based catalyst using incipient wetness impregnation. In this method, it was found that the calcination temperature influenced the dispersion of the catalytically active material within the catalyst.

U.S. Pat. No. 4,783,434 describes a process for providing a uniform distribution of a catalytically active composition over the interior and exterior surfaces of carrier bodies. In this process a carrier body is impregnated with a solution of a complex of a catalytically active composition, the viscosity of which solution is not decreased upon heating and/or upon evaporation of the solvent, and subsequently evaporating the solvent and decomposing the complex by heating. U.S. Pat. No. 4,783,434 describes that a major advantage of this process is that it makes it possible for an active composition with a large specific area to be applied to a carrier body having wide pores, and hence a surface that is well accessible, without agglomerates of small particles of the active composition forming leading to the presence of narrow pores in the catalyst.

The distribution of the metal compound particles in the material can be assessed by electron microscopy, e.g. TEM and SEM.

Typically the ferromagnetic carbon body according to the invention comprises about 10-90 wt. % graphitic carbon, preferably the 20-80 wt. % graphitic carbon, more preferably 25-70 wt. % graphitic carbon and even more preferably 30-60 wt. % graphitic carbon, preferably as determined using X-ray diffraction (XRD) in combination with the PONKCS ("Partial or no known crystal structures") method, as described by N. V. Y. Scarlett, I. C. Madsen, Powder Diffraction 21(2006)278-284. The BET surface area of the ferromagnetic carbon body is typically 200 to 1000 m$^2$/g, preferably 250 to 950 m$^2$/g, and more preferably 300 to 900 m$^2$/g. The BET surface area, as used herein, is the value that can be measured by determining the amount of nitrogen adsorbed at 77 K and P/Po of approximately 0.3 and assuming a nitrogen cross sectional area of 16.2 Å$^2$, after degassing the sample at 180° C. on a Micromeritics ASAP 2420.

Preferably, the total pore volume of the ferromagnetic carbon body is between 0.15 and 0.8 ml/g, more preferably between 0.2 and 0.6 ml/g. The total pore volume, as used herein, is the value measured by determining the volume of liquid nitrogen adsorbed at P/Po of approximately 1, using a Micromeritics ASAP 2420.

The average pore diameter of the ferromagnetic carbon body of the invention is preferably between 3 and 9 nm, and more preferably between 4 and 8 nm. The average pore diameter, as used herein, is the value determined by dividing the total pore volume by the BET surface area, and assuming that the pores are cylindrical. The BJH method can be used to calculate the pore size distributions from experimental isotherms using the Kelvin model of pore filling. The presence of micropores could be established from a t-plot analysis.

Surprisingly, the ferromagnetic carbon bodies of the invention exhibit a substantially lower micropore volume than the activated carbon starting materials. This is because during the recrystallization process mesopores are introduced at the expense of the micropores. The advantage of this is that this leads to an improved rate of transport of a liquid through the porous structure of the bodies. Micropores and mesopores, as classified by IUPAC 1994, have pore diameters of <2 nm and 2-50 nm, respectively.

It is desirable to have bodies with a side-crushing strength (SCS) that is as high as possible. The SCS may be determined for bodies having a regular or almost regular shape, such as spheres, extrudates or tablets. The SCS of the bodies of the invention was measured using a Chatillon DFE force gauge. However, any suitable force gauge may be used to measure the SCS. It has been found that the period of time that the bodies are kept at the pyrolysis temperature can influence the SCS.

The ferromagnetic carbon body of the invention may be in the form of a powder, particles, granules and shaped bodies, such as spheres, extrudates or tablets.

Typically the ferromagnetic metal of the ferromagnetic carbon body may be selected from the group consisting of iron, nickel, and cobalt metals and/or alloys, and combinations thereof. Preferably, the ferromagnetic metal is iron or an iron alloy.

In addition, the metal particles of the ferromagnetic carbon body of the invention may be completely encapsulated (e.g. >99 wt. % of the metal particles) by graphitic carbon layers. This may be achieved by a treatment of the ferromagnetic carbon body in a flow of hydrogen and a carbon containing molecule at an elevated temperature.

The advantage of complete encapsulation of the metal particles in graphitic layers, in particular iron particles, is that oxidation and dissolution of the metal particles is prevented when used in a variety of liquids. Complete encapsulation also prevents the formation of finely divided hydrated iron(III) species, which are very difficult to remove by filtration or centrifugation.

The ferromagnetic carbon body according to the invention may further comprise a polymer, preferably present on the surface of said bodies. Suitable polymers which may be used, for instance, include homopolymers and copolymers such as, block copolymers, random copolymers and graft copolymers. An advantage of such polymers is that they may be functionalized with chemical groups which dissociate in aqueous solution, thus stabilizing the suspended ferromagnetic carbon bodies in an aqueous solution. The polymers can also be used for the targeted removal of contaminants or compounds of interest, such as charged and uncharged species, hydrophilic/hydrophobic compounds, pharmaceuticals, and metabolites.

The ferromagnetic carbon body of the invention may also comprise additional particles of a metal and/or metal oxide, preferably on the (internal) surface of the bodies. More preferably, said ferromagnetic carbon body comprises ferromagnetic metal particles completely encapsulated by graphitic carbon layers. Typically the metal and/or metal oxide of the additional particles may include iron, nickel, cobalt, catalytically active metals and/or oxides, and combinations thereof. Suitable catalytically active metals may include zinc, copper, manganese, molybdenum, vanadium, tungsten and precious metals. Such ferromagnetic carbon bodies may suitably be used, for instance, as adsorbents or heterogeneous catalysts.

The ferromagnetic carbon body of the invention may, in addition, be provided with carbon nanotubes and/or carbon nanofibres. Such ferromagnetic carbon bodies may be suitably used as catalyst supports in liquid phase reactions where transport is important in maintaining selectivity at a high enough level.

Ferromagnetic carbon bodies with a dense layer of carbon nanofibers and/or carbon nanotubes also provide an excellent electrical contact and are, hence, extremely appropriate to be used in the electrochemical applications. Preferably such ferromagnetic carbon bodies are used in magnetically stabilized fluidized bed electrodes.

The ferromagnetic carbon bodies of the invention typically range in size from about 100 nm to 20 mm, depending upon the intended application. In slurry applications the typical size of the ferromagnetic carbon bodies is between 0.5 µm and 150 µm, and in fixed bed applications between 1 and 10 mm. For the removal of humic and fulvic acids, it is preferable to use a ferromagnetic carbon body having a size<1 µm.

An additional embodiment of the invention is directed to the use of a ferromagnetic carbon body as a catalyst suitable for producing olefins by hydrogenating carbon monoxide. Preferably, the ferromagnetic metal of the body is iron or an iron alloy. More preferably, the metal particles of the body are not or only partly encapsulated in graphitic carbon. Typically the body has a size between 1 and 5 mm, making it suitable for use in a fixed bed.

A further object of the invention is to provide a process for the preparation of a ferromagnetic carbon body of the invention.

Accordingly, the invention is also directed to a process for the production of a ferromagnetic carbon body, wherein said process comprises impregnating activated carbon with an aqueous solution of a metal compound, drying the impregnated activated carbon, and pyrolyzing the dried impregnated activated carbon under an inert atmosphere, thereby reducing the metal compound to the corresponding metal.

The activated carbon may be impregnated one or more times with the aqueous solution of a metal compound using incipient wetness impregnation wherein the volume of said solution used is equal to or less than the pore volume of the activated carbon. Alternatively, the activated carbon may be impregnated with the aqueous solution of a metal compound by immersion of the activated carbon in said solution for a period of time of less than is required for a homogeneous distribution of the non-volatile metal compound. This period is dependent on factors such as the viscosity of the impregnation solution, temperature and type of carbon body. This period can be on the order of minutes and is typically 60 min or less, preferably 30 min or less, and more preferably 10 min or less.

The pyrolysis temperature used can be chosen within a wide range depending on the desired SCS, or the desired pore structure. With higher temperatures, more activated carbon can be recrystallized to graphitic carbon. The temperature used in the process of the invention to pyrolyze the dried impregnated activated carbon is typically >700° C., preferably >800° C.

It has been established that the metal in the impregnated metal compound, in particular iron in iron compounds, may be reduced by the carbon to the metal at temperatures above 700° C. At lower temperatures the reduction of iron compounds proceeds only to magnetite, $Fe_3O_4$. Without wishing to be bound by theory it is believed that the recrystallization of the amorphous carbon in the activated carbon is due to the fact that the reduced metal, in particular metallic iron, is able to take up carbon from the amorphous carbon and react to form an unstable metal carbide. Subsequently the carbon from the metal carbide is segregated as graphitic carbon. The recrystallization of the activated carbon to graphitic carbon brings about a drop in the BET surface area and an increase in both the average pore diameter and total pore volume.

The activated carbon used as a starting material in the process of the invention may be in the form of a powder, particles, granules and shaped bodies, such as spheres, extrudates or tablets.

In a further embodiment, the invention is directed to a process for the production of a ferromagnetic carbon body, which process comprises mixing activated carbon powder with a metal compound powder, shaping the resulting mixed powder into a body, and pyrolyzing the shaped body under an inert atmosphere, thereby reducing the metal compound to the corresponding metal.

The advantage of this process is that it allows for a low conversion of the activated carbon to graphitic carbon. This is believed to be due to the limitations of mixing for dispersing the metal compound powder in the activated carbon powder.

Typically the temperature used to pyrolyze the shaped body in the above-mentioned process of the invention is also >700° C., preferably >800 C.

The mixed powder is typically shaped using methods known in the art, such as extrusion, tabletting or granulation.

The activated carbon used as a starting material in the processes of the invention may be produced by conventional means from carbonaceous source materials such as nutshells, peat or wood and consists almost essentially (e.g. >99 wt. %) of amorphous carbon.

The metal compounds which may suitably be used in the processes of the invention are non-volatile metal compounds which are precursors of the ferromagnetic metals and/or alloys. Non-volatile metal compounds, as defined herein, are metal compounds which when impregnated onto the activated carbon in the process of the present invention, do not volatilize during the pyrolysis process step. Preferably, the metal compounds may be selected from the group consisting of iron, nickel and cobalt compounds, and combinations thereof. More preferably the metal compound used is an iron compound. Even more preferably, the metal compound is iron(III) nitrate or iron(III) ammonium citrate.

Surprisingly it has been found that using non-volatile metal compounds in the process of the present invention enables control of the conversion of the activated carbon to graphitic carbon by the controlled distribution of the metal compounds throughout the activated carbon. Without wishing to be bound by theory it is believed that this is because such metal compounds, do not re-disperse throughout the activated carbon during the pyrolysis step, but instead remain essentially at the location in which they were impregnated into the activated carbon.

Since the ferromagnetic carbon body of the invention typically comprises metal particles not encapsulated or only partly encapsulated in graphitic carbon, the exposed metal surfaces of these particles can oxidize upon exposure to atmospheric air. When oxidation is not desired, the ferromagnetic metal particles of the bodies can be protected by encapsulation in graphitic carbon layers by a treatment in a flow of hydrogen and a carbon containing molecule at an elevated temperature. Suitable carbon containing molecules which can be used include benzene, toluene, CO, lower alkanes, alkenes, alcohols, alkyns, and combinations thereof. The temperature typically used is >800° C. Such a treatment typically results in complete encapsulation (e.g. >99 wt. %) of the metal particles. Since ferromagnetic carbon bodies can be readily separated by inhomogeneous magnetic fields, separation of such bodies in a slurry can be readily achieved.

The ferromagnetic carbon bodies of the invention may be further modified by adsorbing a polymer onto the graphitic surface of the bodies. The graphitic carbon surface of the bodies exhibits attractive properties which enables the adsorption of polymers onto the bodies.

In addition, the ferromagnetic carbon bodies of the invention may be modified by loading the bodies with a metal and/or metal oxide. Preferably, the ferromagnetic carbon body to be modified comprises ferromagnetic metal particles completely encapsulated by graphitic carbon layers. Such loading methods which may be used include impregnation of ferromagnetic carbon bodies with an aqueous solution of a metal compound followed by heating or deposition of a metal compound onto the surface of the bodies. The metal compounds which may be used include iron, nickel and cobalt compounds, compounds of catalytically active metals and combinations thereof.

If it is desired to limit impregnation to the surface of the ferromagnetic carbon body, an additional compound may be added to the aqueous solution to increase the viscosity upon volatilization of the solvent, such as described in U.S. Pat. No. 4,783,434. An example of such an additional compound which may be used is ethylhydroxycellulose. The impregnated ferromagnetic carbon body is then typically dried and thermally heated. The advantage of this method is that it results in metal and/or metal oxide particles on the surface of the body.

Further, the ferromagnetic carbon bodies of the invention may be provided with carbon nanotubes and/or carbon nanofibres according to the processes as described in WO-A-2010/098669, which is incorporated herein by reference.

As previously mentioned, the amorphous carbon present in activated carbon is much more liable to oxidation than the graphitic carbon resulting from the interaction with the carbide forming metals. Another aspect of the invention is thus directed to increasing the porosity of an activated carbon body by converting a fraction of the amorphous carbon to graphitic carbon and then selectively oxidizing part of the remaining amorphous carbon to carbon dioxide and carbon monoxide. The oxidation may be performed by contacting it with oxygen in a controlled manner, for instance this may be performed by heating the carbon body under a highly diluted oxygen atmosphere (e.g. <0.1 vol. % oxygen in an inert (e.g. argon, nitrogen)) atmosphere or by contacting the ferromagnetic carbon body with one or more acids, for instance, a mixture of sulphuric acid and nitric acid in the liquid phase at an elevated temperature.

When ferromagnetic carbon bodies are not desired, the bare ferromagnetic metal particles can be removed by contacting the bodies with an acid and then rinsing. Suitable acids which may be used to dissolve the metal particles include nitric acid, hydrochloric acid, sulfuric acid and combinations thereof. After rinsing with a liquid, preferably water, the thus dissolved metal particles are removed and an essentially pure (e.g. >99 wt. %) carbon body remains.

Accordingly, a further object of the invention is directed to the production of a carbon body comprising partly graphitized activated carbon, which process comprises contacting a ferromagnetic carbon body of the invention with an acid, thereby dissolving the metal particles; and then rinsing the acid treated ferromagnetic carbon body with a liquid, thereby removing the dissolved metal particles.

Typically >90 wt. %, preferably >95 wt. %, and more preferably >98 wt. % of the metal particles present in the ferromagnetic carbon bodies can be removed by this acid treatment process.

A further object of the invention is directed to a carbon body comprising partly graphitized activated carbon, obtainable by contacting a ferromagnetic carbon body of the invention with an acid, thereby dissolving the metal particles; and then rinsing the acid treated ferromagnetic carbon body with a liquid, thereby removing the dissolved metal particles.

It was found that most of the metal particles could be removed (e.g. >90 wt. %) from the resulting carbon bodies by the acid treatment. Typically the carbon bodies of the invention comprise <1 wt. % metal particles, calculated as metal based on the weight of the carbon body.

It was also found that the acid treatment did not affect the graphitic carbon content of the carbon bodies produced. In addition, the pore structure of the carbon bodies of the invention was found to be comparable to that of the source material, i.e. the ferromagnetic carbon bodies of the invention.

The carbon body of the invention, like the ferromagnetic carbon body of the invention, comprises about 10-90 wt. % graphitic carbon, preferably the 20-80 wt. % graphitic carbon, more preferably 25-70 wt. % graphitic carbon and even more preferably 30-60 wt. % graphitic carbon, preferably as determined using XRD in combination with the PONKCS method.

The total pore volume of the carbon body of the invention is also typically >0.1 ml/g, preferably >0.15 ml/g, and more preferably >0.2 ml/g.

The average pore diameter of the carbon body of the invention typically is between 2 and 10 nm, preferably >3 nm, and more preferably >4 nm.

In a further embodiment the carbon bodies and ferromagnetic carbon bodies of the invention may be used as an adsorbent or as a catalyst support. In addition, the bodies of the invention may be advantageously used in the treatment of water flows or in electrochemical applications.

The carbon bodies and ferromagnetic carbon bodies of the invention may be advantageously used for the removal of contaminants, such as metal ions, phosphates and organic compounds, out of water flows, due to the fact that the (internal) surface area of such bodies is better accessible from the bulk of the liquid. Since the surface of the remaining activated carbon contains carboxylic acid groups after exposure to atmospheric air and is, hence, more reactive than the surface of graphitic carbon, the graphitic carbon bodies according to the invention can be advantageously used to bind positively charged contaminating or valuable species. Since the fraction of the activated carbon that is converted into graphitic carbon can be controlled according to the invention, an optimum can be achieved between accessibility and capacity of the adsorbent.

It has been established that both metallic iron and iron oxide have specific possibilities in the recovery of metal ions from solution. Metallic iron can react with more noble elements, such as, copper, silver and gold, in which reaction the more noble metal is deposited on the iron and the iron dissolves. Zhang et al. describe the application of unsupported reduced iron nanoparticles, called nano zero-valent iron (nZVT), in the removal of metal cations from aqueous solution (J. Phys. Chem. C 111(2007)6939-6946). If nZVT are brought into the aqueous solution, fast corrosion occurs, and unless the liquid is highly acidic, a core-shell structure is formed of a reduced iron core with a porous oxidic/hydroxidic shell. Apparently the oxidic/hydroxidic shell can be penetrated readily by reacting dissolved cations.

The thickness of the oxidic/hydroxidic layer can be controlled by limiting the reaction with oxygen (passivation). The passivation procedure can e.g. involve exposure to an inert gas flow containing a small amount (e.g. 0.5 vol. %) of oxygen or exposure to a gas flow containing carbon dioxide. Also exposure to a gas flow containing some dinitrogen oxide ($N_2O$) has been described. The carbon bodies with the passivated iron particles are subsequently brought into the water to be purified. A more tedious, but also more attractive procedure is to keep the carbon bodies after production in an inert gas and introduce the bodies subsequently in the water avoiding exposure to atmospheric air as much as possible.

Also iron oxide exhibits well known, highly favorable properties for the purification of water. Two embodiments of the present invention concern the use of metallic iron particles present in the carbon bodies. The first involves the use after (controlled) oxidation of the metallic iron particles. With the second procedure the metallic iron particles are encapsulated in graphitic layers and separately finely divided iron oxide is deposited on the surface of the ferromagnetic carbon bodies according to one of the procedures known in the art of production of supported catalysts. The last embodiment has the advantage that after saturation the iron oxide can be dissolved in acids and new iron oxide can be deposited on the thus regenerated ferromagnetic carbon bodies.

Additionally, the reactivity of the iron particles in the ferromagnetic carbon bodies can be raised by addition of a solution of a more noble element, preferably, copper. The copper will be deposited as metallic copper on the iron surface, which can facilitate deposition of other more noble metal species on the iron surface.

In addition, ferromagnetic carbon bodies of the invention, in particular, may be used in fluidized bed electrodes for removing metal cations from water flows. By a suitable magnetic field the ferromagnetic carbon bodies can be aligned along the field lines of an external magnetic field, thus avoiding the problems with the confinement of the electrically conducting particles in the electrode structure. Metal cations can accordingly be removed from water flows. In a preferred embodiment of the invention the iron particles are encapsulated within graphitic layers and finely divided copper or precious metal particles are subsequently deposited onto the ferromagnetic carbon bodies according to procedures known in the art of the production of solid catalysts. Metal cations can accordingly be removed from water flows at a lower overpotential. Without limiting the scope of the invention, it is believed that the copper or precious metal particles can provide nucleation sites where the reducing metal ions can deposit. After deposition the ferromagnetic carbon bodies may be regenerated by contacting the bodies with acids, thus removing the deposited metals and new copper or precious metal particles can be deposited on the thus regenerated ferromagnetic carbon bodies.

The magnetically stabilized fluidized bed electrodes may be used to oxidize, for example, large organic compounds, such as humic and fulvic acids, adsorbed by the ferromagnetic carbon bodies and regenerate the bodies. Preferably, the ferromagnetic carbon bodies used in electrochemical applications are provided with carbon nanofibers and/or carbon nanotubes.

The ferromagnetic carbon bodies according to the invention may also be used in a reverse flow technique. Typically a slurry of ferromagnetic carbon bodies is added to the liquid flow to be purified. The ferromagnetic carbon bodies may then be captured by an inhomogeneous magnetic field after a controlled residence time in the liquid flow. When sufficient ferromagnetic bodies have been collected by the magnetic field, the magnetic field is switched off and the liquid flow is reversed. Another inhomogeneous magnetic field captures the used ferromagnetic carbon bodies at a different location in the liquid flow.

The carbon bodies and ferromagnetic carbon bodies may also be employed as catalyst supports or catalysts. The production of supported catalysts containing metallic iron is difficult. With a hydrophilic support it is almost impossible to decrease the water vapor pressure to a level where the reduction to metallic iron is thermodynamically viable. Nevertheless it is highly important to produce supported metallic iron catalyst, e.g., for the production of olefins from carbon monoxide-hydrogen flows or for the synthesis of ammonia. According to a special embodiment of the present invention the ferromagnetic carbon bodies containing metallic iron particles are therefore employed as supported metallic iron catalysts. Thermal pretreatment at a relatively low temperature in a reducing gas flow is sufficient to produce metallic iron. The surface of both amorphous and graphitic carbon is hydrophobic upon thermal treatment at a temperature above about 300° C.

Magnetic separation of the ferromagnetic carbon bodies, in particular, is also highly attractive with suspended catalysts employed in liquid phase reactions. The separation can be performed without exposure of the catalyst to atmospheric air. It is also possible to stop, for instance, a hydrogenation after a certain amount of hydrogen has been consumed by collecting the ferromagnetic carbon body support on a magnet. The ability to interrupt a catalytic reaction can lead to a considerably higher selectivity.

The invention is now elucidated on the basis of some examples, which are not intended to limit the scope of the invention.

EXAMPLES

Example 1 (Comparative)

Untreated Activated Carbon Extrudates

The micropore structure of untreated activated carbon extrudates (JEC carbon 1.8 mm SHIRASAGI C2×8/12 coconut-shell based pelletized activated carbon) and the presence of graphite were determined by $N_2$-adsorption measurements and XRD, respectively.

Physical adsorption of nitrogen at −196° C. using a Micromeritics ASAP 2420 apparatus was used to determine the textural properties of the example. The BET surface area and pore size distributions were determined by BET and BJH methods, respectively. The presence of micropores was determined from a t-plot analysis. Prior to the measurements, all samples were degassed under vacuum until a pressure lower than 10 μm Hg at 180° C.

Powder X-ray diffraction (XRD) patterns were obtained with a Bruker D8 ADVANCE (Detector: SOL'X, Anode: Copper, wavelength: 1.542 Å, Primary Soller slit: 4°, Secundary Soller slit: 4°, Detector slit: 0.2 mm, Spinner: 15 RPM, Divergence slit: variable V20, Antiscatter slit: variable V20, Start: 10° 2 theta, Stop: 100° 2 theta, Stepsize: 0.05° 2 theta, Time/step: 8 sec, Sample preparation: Front loading).

The amount of elemental iron in example 1 was measured by inductively coupled plasma (Thermo Electron IRIS intrepid ICP with RF Generator, Fe measured at 239.562 nm and 240.488 nm).

Example 1a

Heat Treated Activated Carbon Extrudates

The activated carbon extrudates (JEC carbon 1.8 mm SHIRASAGI C2×8/12 coconut-shell based pelletized activated carbon) was heat treated at 800° C. for 1 hour under nitrogen atmosphere. The analyses are the same as that of example 1 and can be found in table 1 below.

Table 1 shows the amount of iron in wt. %, the BET surface area (BET SA) in $m^2/g$, the total pore volume (Total PV) in ml/g, the average pore diameter (APD) in Å, and the SCS in N of example 1 and example 1a. SCS was measured with 20-25 extrudates with a selected length between 4.5-5.5 mm on a Chatillon DFE force gauge. This meter crushes the extrudates between a fixed and a pneumatic punch (maximum distance 0.9 mm), with a fixed rate and a controlled punch.

TABLE 1 analyses of example 1

| units | Amount Fe wt. % | BET SA m²/g | Total PV ml/g | APD Å | SCS N |
|---|---|---|---|---|---|
| example 1 | <0.1 | 1104 | 0.08 | 43 | 66 |
| example 1a | | 1158 | 0.10 | 41 | |

FIG. 1 shows the t-plot measurement of example 1. The y-intercept of the linear plot indicates the amount of micropores present in example 1. A lower y-intercept typically indicates that a lower amount of micropores is present in the sample. The t-plot measurement was also taken of example 1a (not shown) and was found to be very comparable to the t-plot of example 1 shown in FIG. 1.

Figure 2:
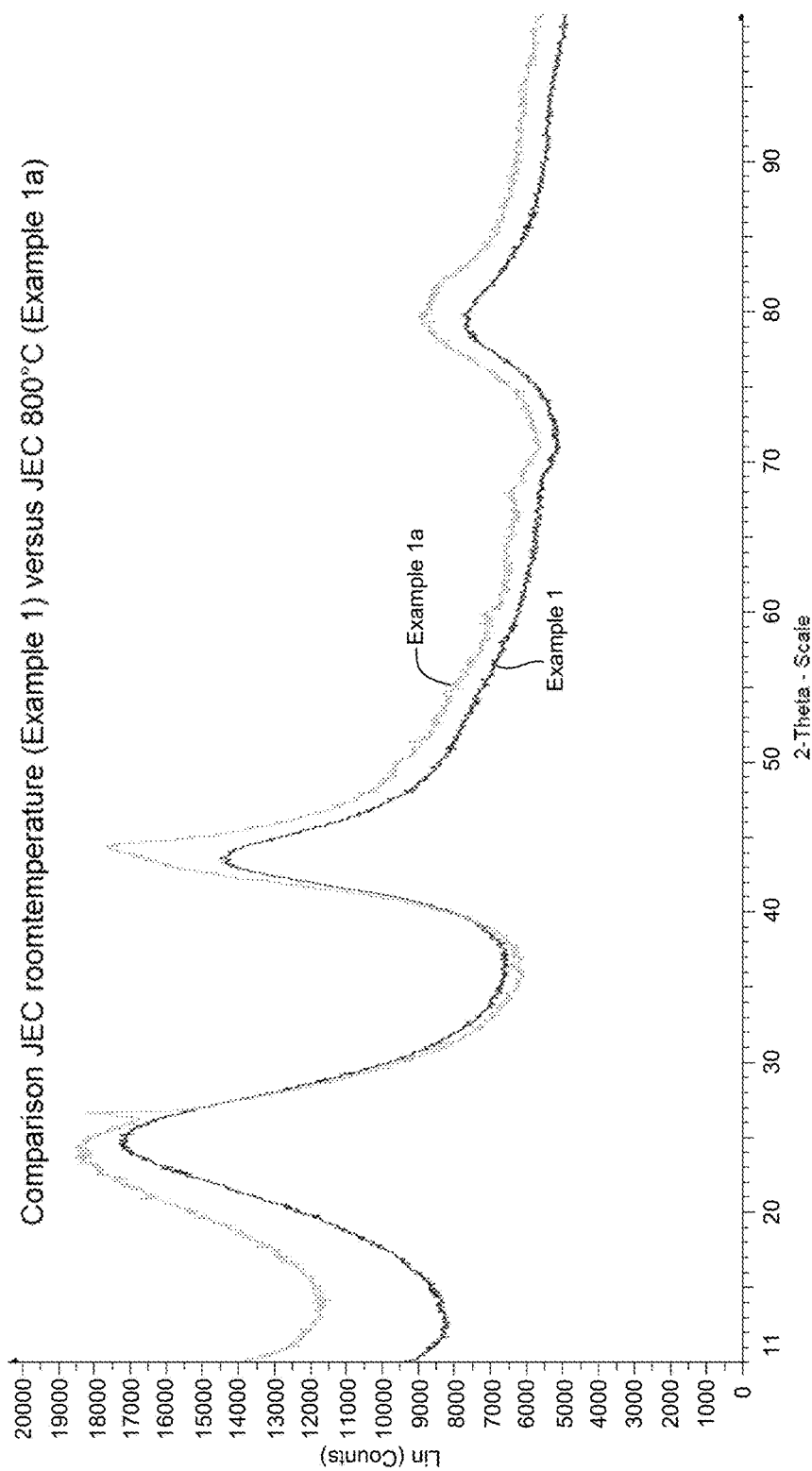
FIG. 2 shows x-ray diffraction spectra of the first example extrudate.

FIG. 2 shows the XRD spectra of example 1 (black line) and example 1a (grey line). The amount of graphitic carbon is indicated at the peak at 26 2-theta scale. The broad reflections shown in Example 1 (see FIG. 2, black line) and example 1a (grey line) are indicative for amorphous carbon. This shows that pyrolysis of the activated carbon bodies in the absence of metal compounds at these temperatures does not lead to graphite formation.

Example 2

Ferric(III)Nitrate Nonahydrate/800° C./3 h

Ferromagnetic carbon bodies according to the invention were prepared by placing 40 g of the activated carbon extrudates (JEC carbon 1.8 mm SHIRASAGI C2×8/12 coconut-shell based pelletized activated carbon) in a 250 mL flask and rotating under vacuum (40 mbar) for at least 30 min. A 37 mL of 58 wt. % solution of ferric(III)nitrate nonahydrate was sprayed under vacuum on the carbon extrudates. The extrudates were dried overnight under vacuum at 40° C. After releasing the vacuum, 35 g of the iron impregnated carbon extrudates were placed in a fixed bed and heated at a rate of 5° C./min to 800° C. under a nitrogen flow of 400 ml/min. After an isotherm of 3 h the material was cooled to room temperature and air was slowly added to stabilize the prepared sample. The yield was 22 g of black carbon extrudates. The micropore structure and the presence of graphite were determined by $N_2$-adsorption measurements and XRD, respectively.

The analyses of example 2 are the same as that of example 1, the results of which can be found in table 2 below.

TABLE 2 analyses of example 2

| units | Amount Fe wt. % | BET SA m²/g | Total PV ml/g | APD Å | SCS N |
|---|---|---|---|---|---|
| example 2 | 10.4 | 826 | 0.22 | 46 | 43 |

Figure 3:
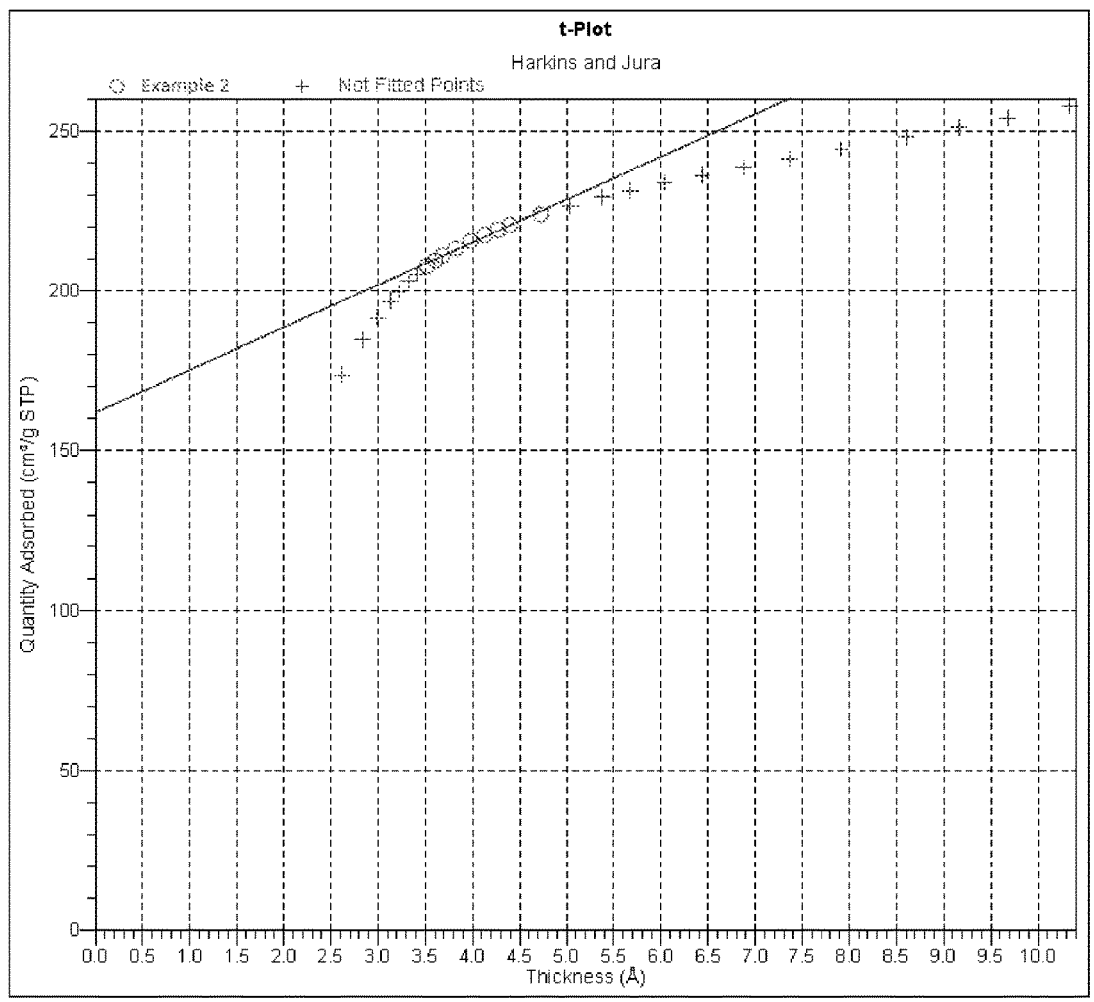
FIG. 3 shows a t-plot measurement of a second example extrudate.
Figure 4:
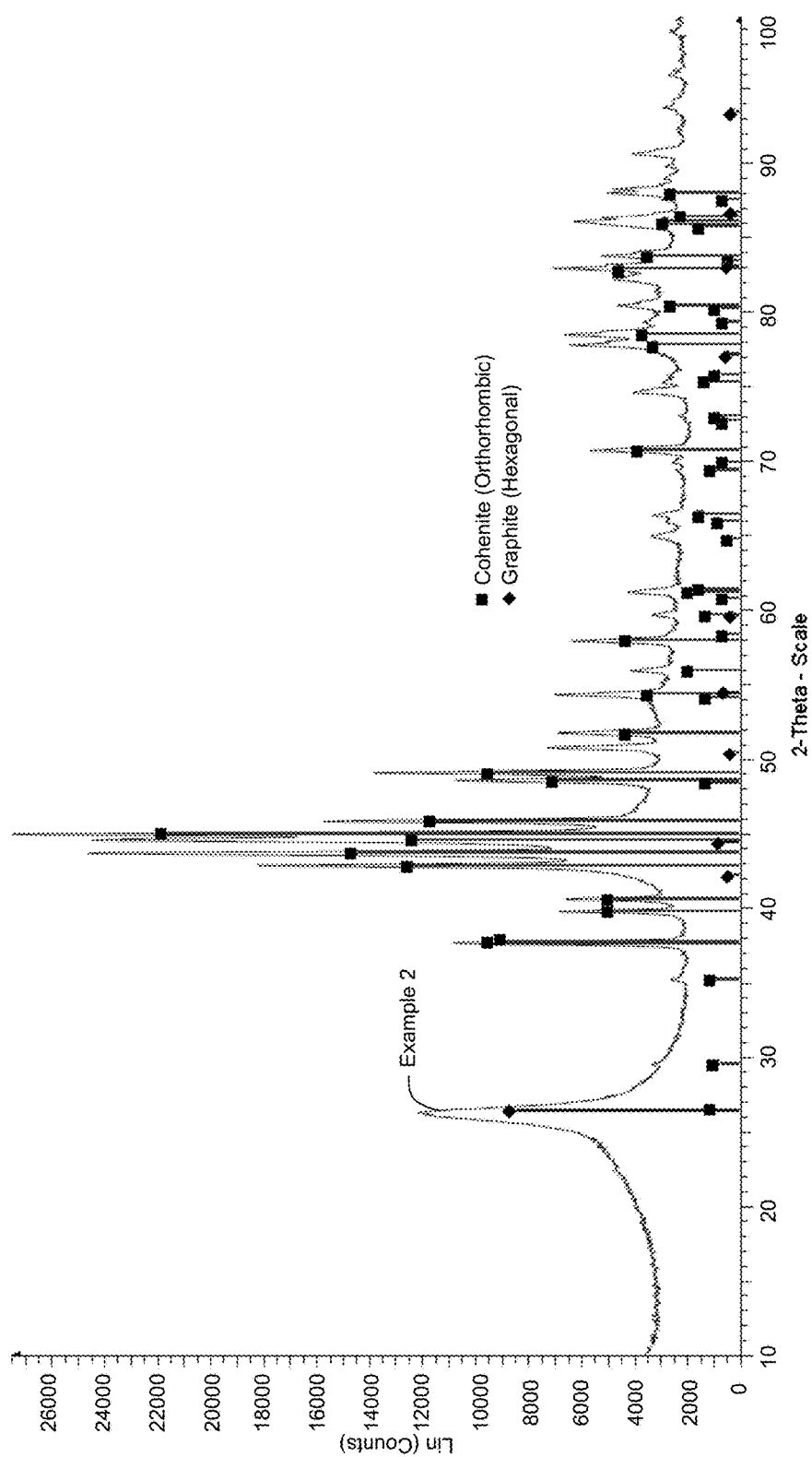
FIG. 4 shows x-ray diffraction spectra of the second example extrudate.

FIG. 3 shows the t-plot measurement and FIG. 4 shows the XRD spectrum of example 2.

Example 2a

Acid Treatment of Example 2 Extrudates

A sample of 5.0 g of example 2 was treated with 15 mL of 4 M HCl, stirred for 2 h, filtered and again treated with 10 mL of 4 M HCl. Then filtered, washed with water and dried overnight at 110° C. The yield was 4.2 g of black extrudates. The analyses are the same as that of example 1 and can be found in table 2a below.

TABLE 2a analyses of example 2a

| units | Amount Fe wt. % | BET SA m²/g | Total PV ml/g | APD Å | SCS N |
|---|---|---|---|---|---|
| example 2a | 0.34 | 881 | 0.28 | 48 | 42 |

Figure 5:
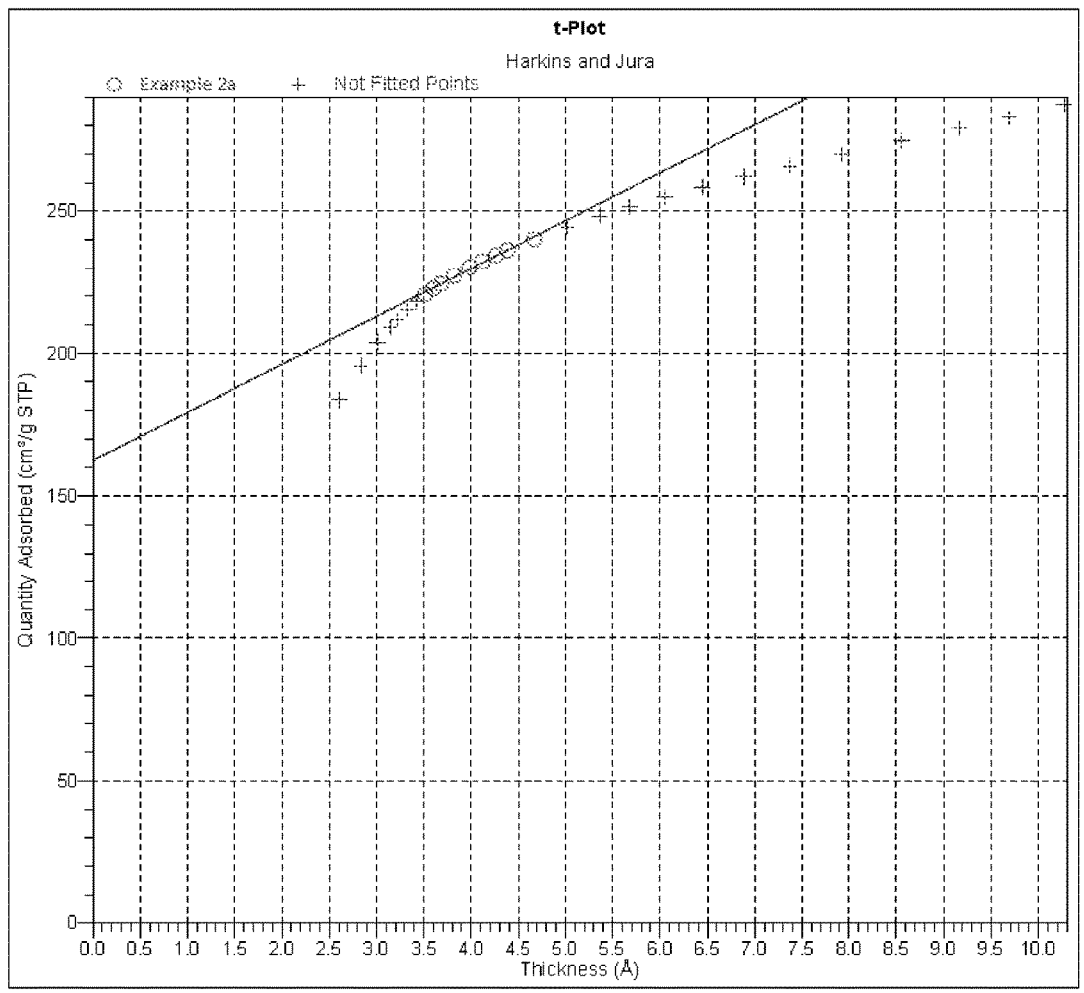
FIG. 5 shows a t-plot measurement of the second example extrudate after acid treatment.

The t-plot of example 2a can be found in FIG. 5.

Figure 6:
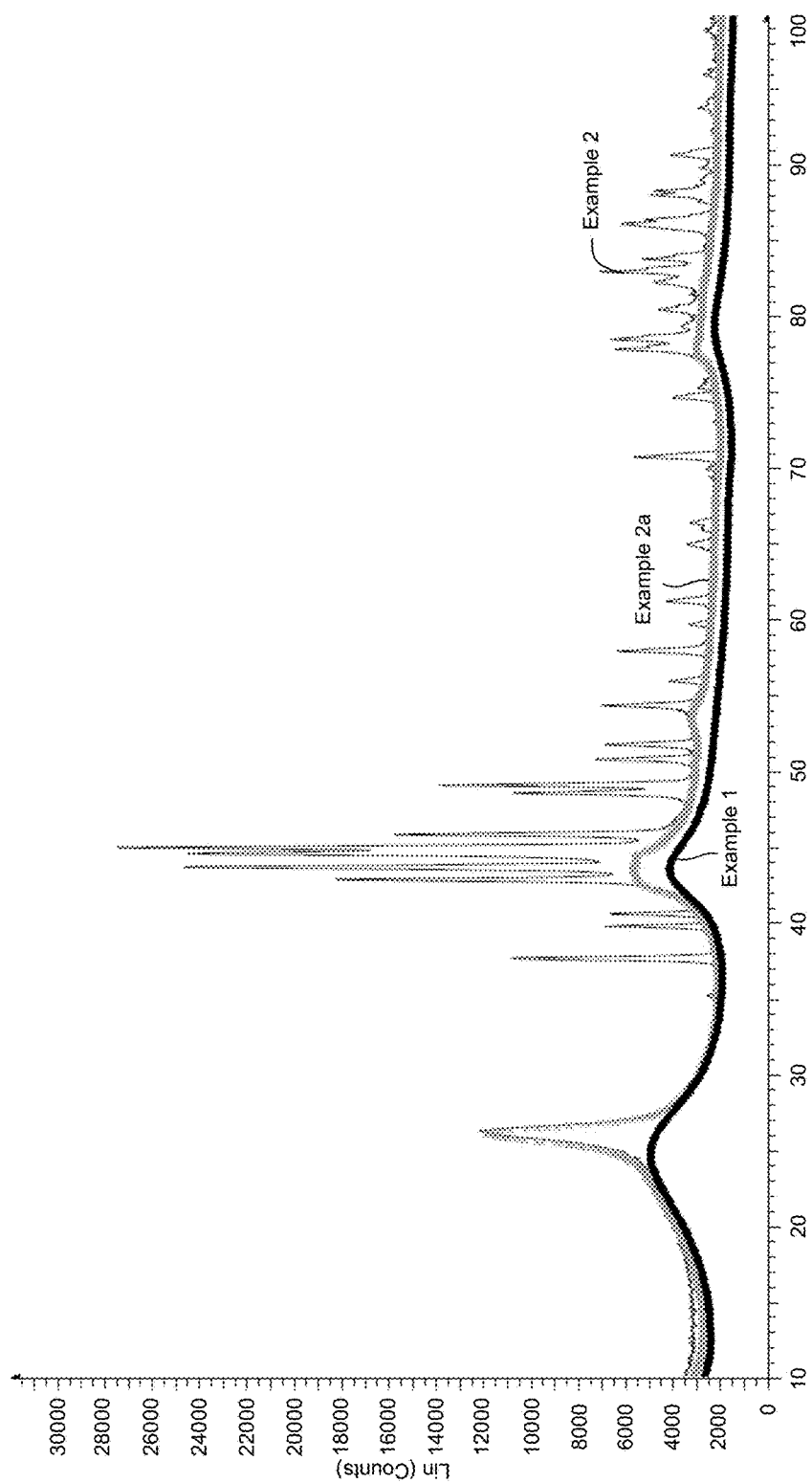
FIG. 6 shows x-ray diffraction spectra of various example extrudates.

FIG. 6 shows the XRD spectra of examples 1, 2 and 2a (see FIG. 6, thick black line, thin black line and grey crosses, respectively).

The XRD spectra of examples 2 and 2a show that iron can be removed from the Fe-containing extrudates (example 2) by acid treatment, without affecting the graphite content (see FIG. 6, peak at 26 2-theta scale). Elemental analysis confirmed that the acid treatment removed >95 wt. % of the iron (see tables 2 and 2a). Furthermore, the pore structure of the acid treated extrudates (example 2a) was comparable to that of the Fe-containing extrudates (example 2) as shown in FIGS. 3 and 5, and tables 2 and 2a.

Example 3

Ferric(III)Nitrate Nonahydrate/1000° C./3 h

A similar procedure to that described in example 2 was carried out for example 3, but using 150 g of the activated carbon extrudates and 140 mL of 58 wt. % ferric(III)nitrate nonahydrate solution. Heat treatment was also performed at 1000° C. instead of 800° C. The yield was 21 g of black carbon extrudates. The micropore structure and presence of graphite were determined by $N_2$-adsorption measurements and XRD, respectively.

The same analyses of the previous examples were also made for example 3, the results of which can be found in table 3 below.

TABLE 3 analyses of example 3

| units | Amount Fe wt. % | BET SA m²/g | Total PV ml/g | APD Å | SCS N |
|---|---|---|---|---|---|
| example 3 | 10.6 | 579 | 0.3 | 52 | 35 |

Figure 7:
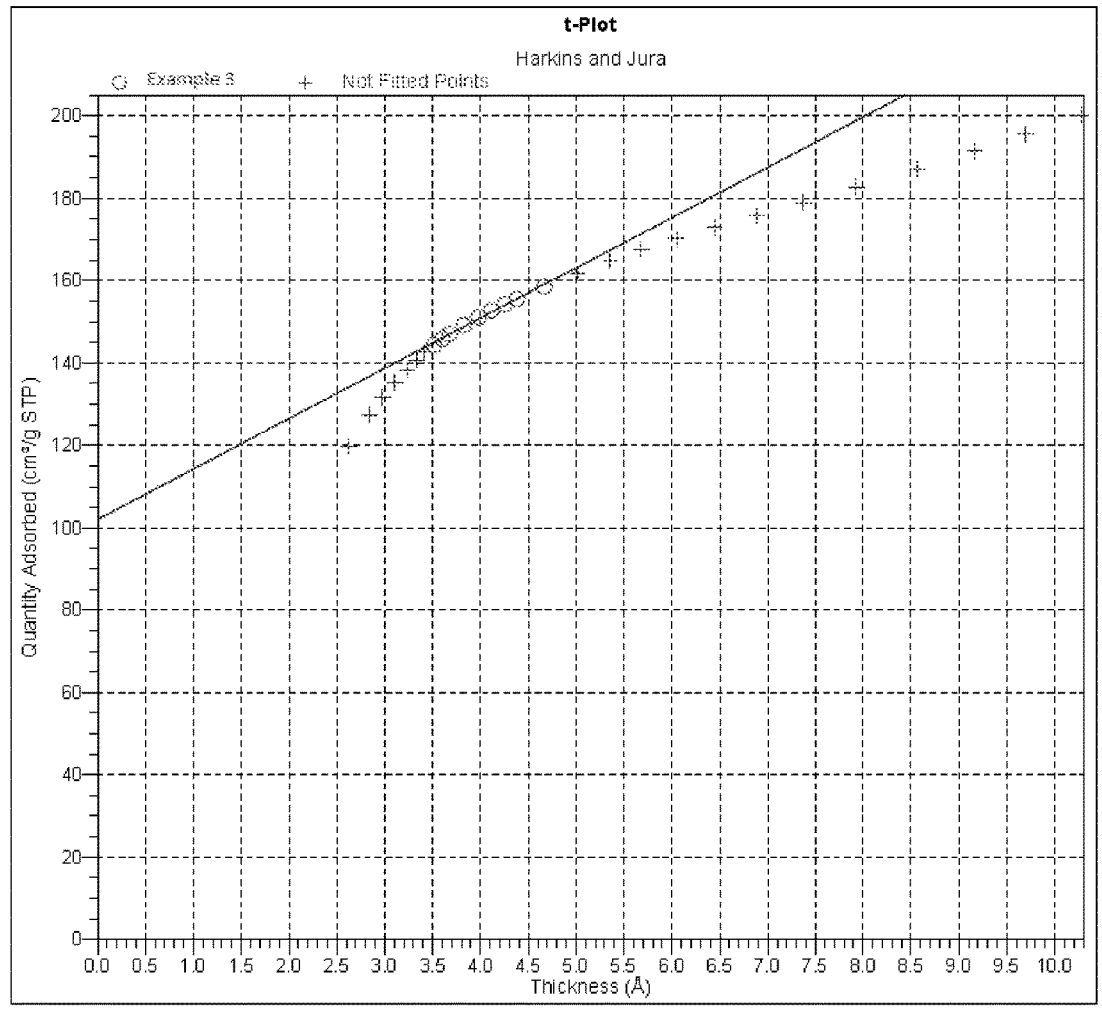
FIG. 7 shows a t-plot measurement of a third example extrudate.
Figure 8:
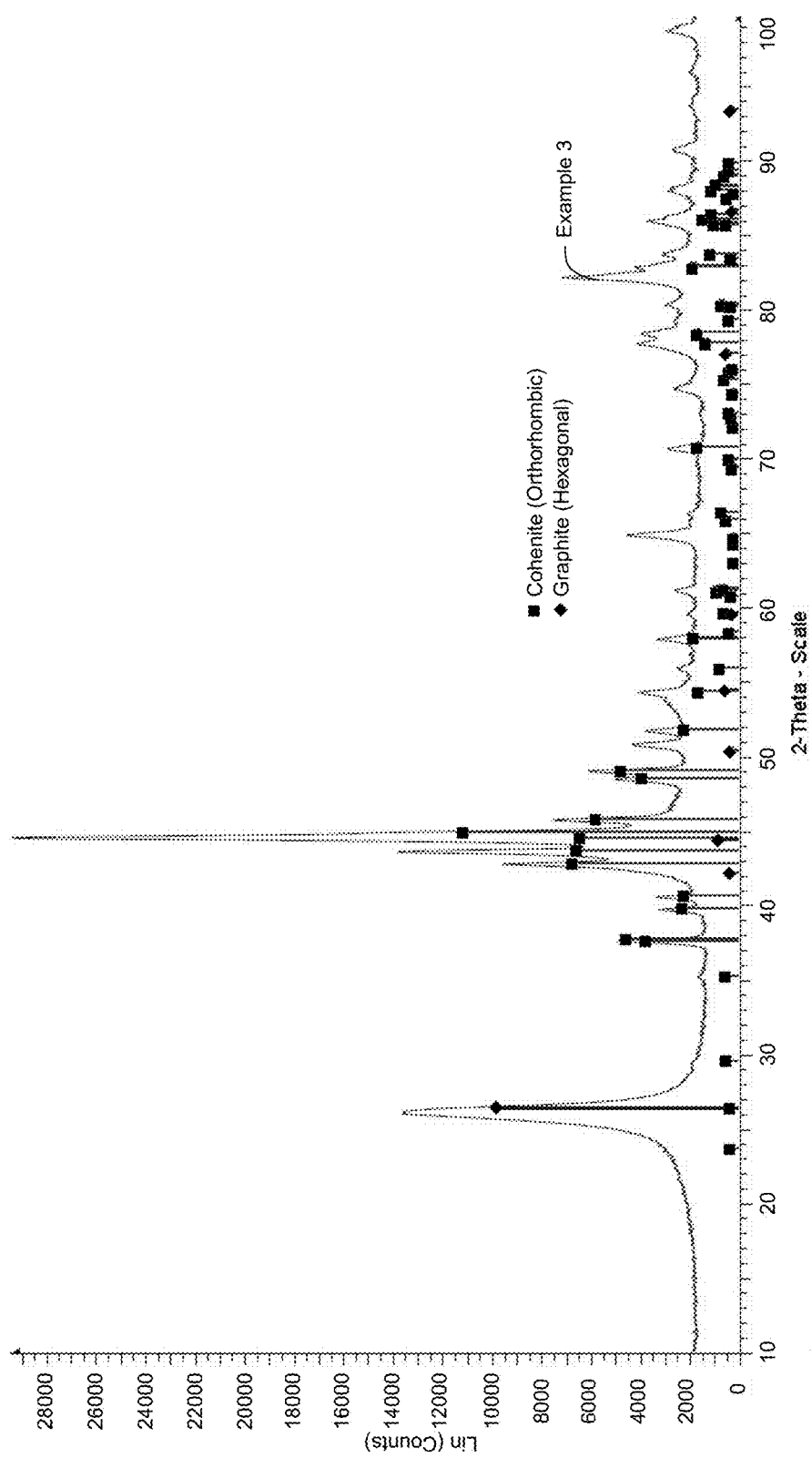
FIG. 8 shows x-ray diffraction spectra of the third example extrudate.

The t-plot measurement and XRD spectrum of example 3 are shown in FIGS. 7 and 8, respectively. In addition, the amount of graphite of example 3 was determined using XRD in combination with a software program named PONKCS ("Partial or no known crystal structures", available from Bruker AXS, Karlsruhe, DE and is according to the method as described by N. V. Y. Scarlett, I. C. Madsen, Powder Diffraction 21(2006)278-284). The amount of graphite carbon in example 3 was determined to be 37 wt. %.

Figure 9:
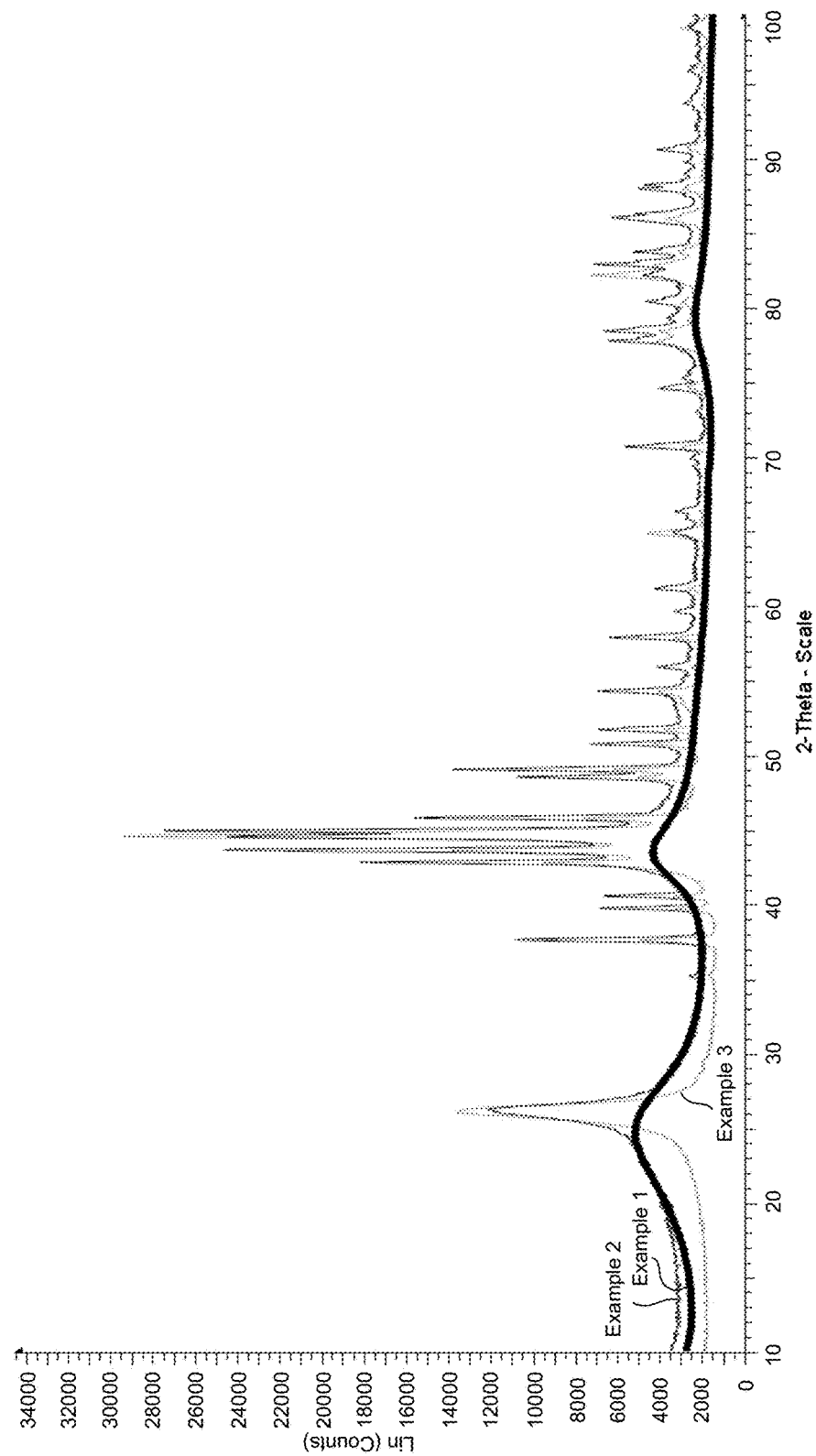
FIG. 9 shows x-ray diffraction spectra of various example extrudates.

FIG. 9 shows the XRD spectra of examples 1-3 (see FIG. 9, thick black, thin black and grey lines, respectively).

The XRD spectra of examples 2 and 3 show that increasing the pyrolysis temperature produced a higher amount of graphitic carbon (see FIG. 9, peak at 26 2-theta scale).

Example 4

Fe Carbon Granules/800° C./3 h

A procedure similar to that described in example 2 was performed, but instead using 50 g carbon granules (Barnebey & Sutcliffe 208-C, 4×8 mesh) instead of extrudates and 47 mL of 58 wt. % ferric(III)nitrate nonahydrate solution. The yield was 21 g of black carbon granules. The micropore structure and presence of graphite were determined by $N_2$-adsorption measurements and XRD, respectively.

Table 4 shows the results of the analyses of example 4, similar to example 1, with the exception being that no SCS measurements were made.

TABLE 4 analyses of example 4

| units | Amount Fe wt. % | BET SA $m^2/g$ | Total PV ml/g | APD Å |
|---|---|---|---|---|
| example 4 | 10.3 | 349 | 0.37 | 65 |

Figure 10:
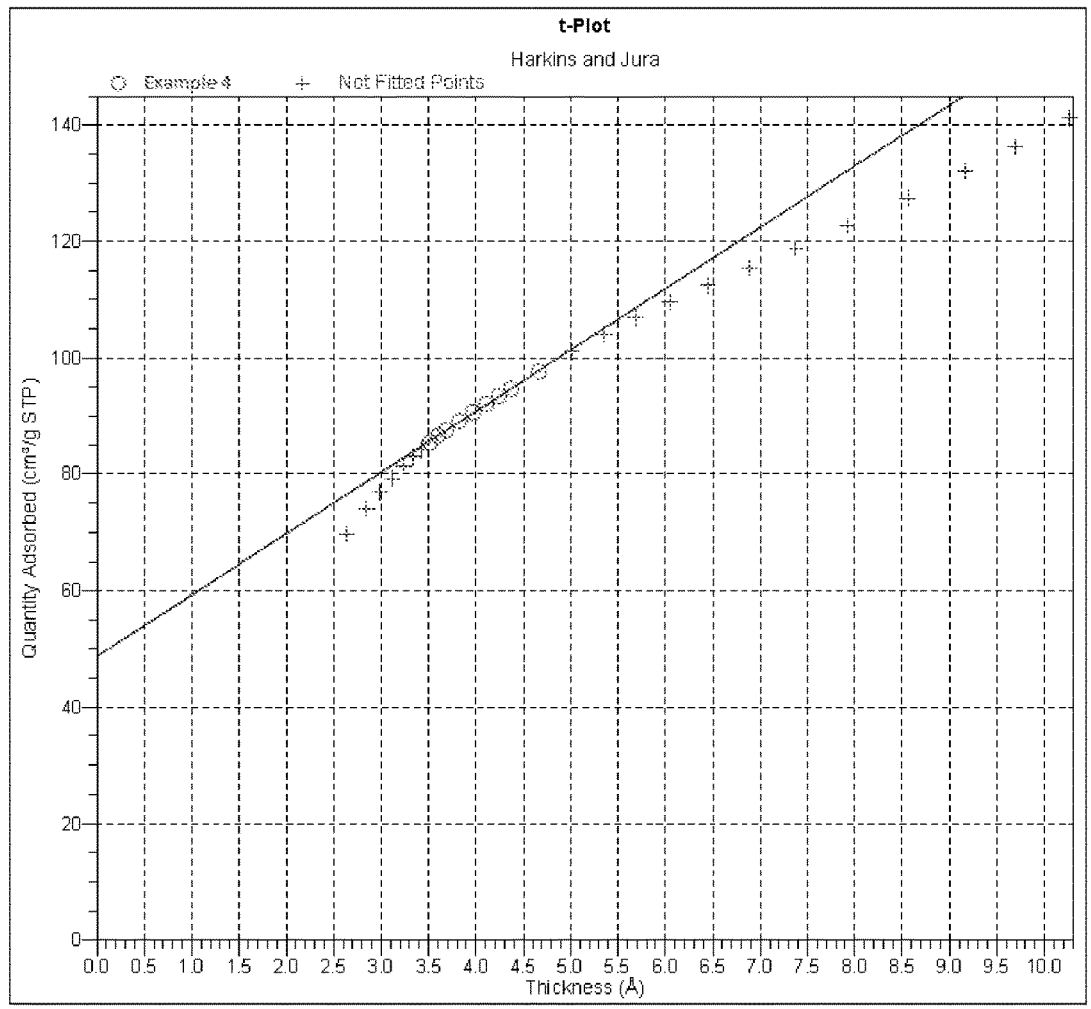
FIG. 10 shows a t-plot measurement of a fourth example extrudate.
Figure 11:
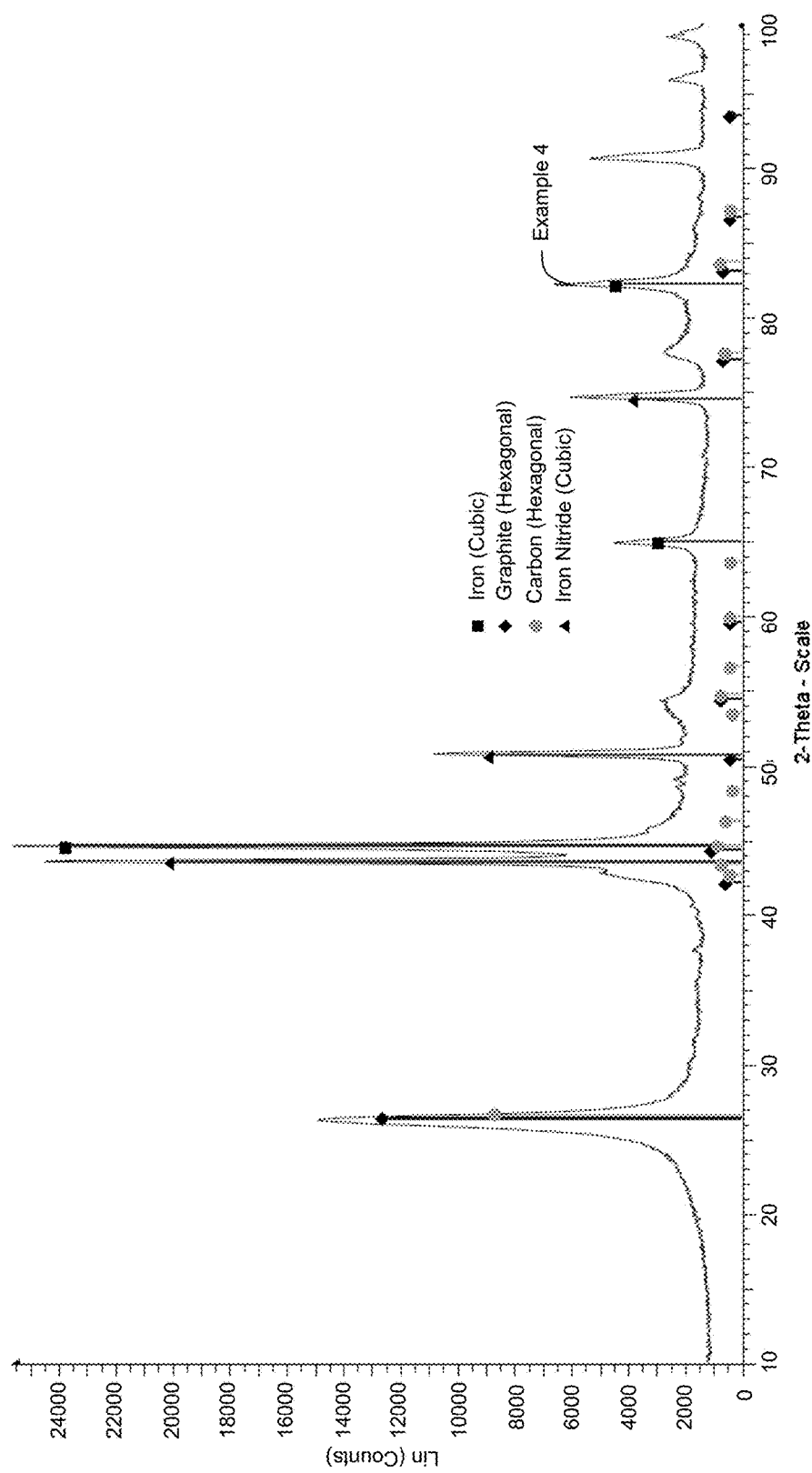
FIG. 11 shows x-ray diffraction spectra of the fourth example extrudate.

The t-plot measurement and XRD spectrum of example 4 are shown in FIGS. 10 and 11, respectively.

Example 4a

Acid Treatment of Example 4 Granules

A sample of 5.0 g of example 4 was treated with 15 mL of 4 M HCl, stirred for 2 h, filtered and again treated with 10 mL of 4 M HCl. Then filtered, washed with water and dried overnight at 110° C. The yield was 3.9 g of black granules. The analyses are the same as that described for example 1, the results of which can be found in table 4a below.

TABLE 4a analyses of example 4a

| units | Amount Fe wt. % | BET SA $m^2/g$ | Total PV ml/g | APD Å |
|---|---|---|---|---|
| Example 4a | 0.70 | 624 | 0.31 | 64 |

Figure 12:
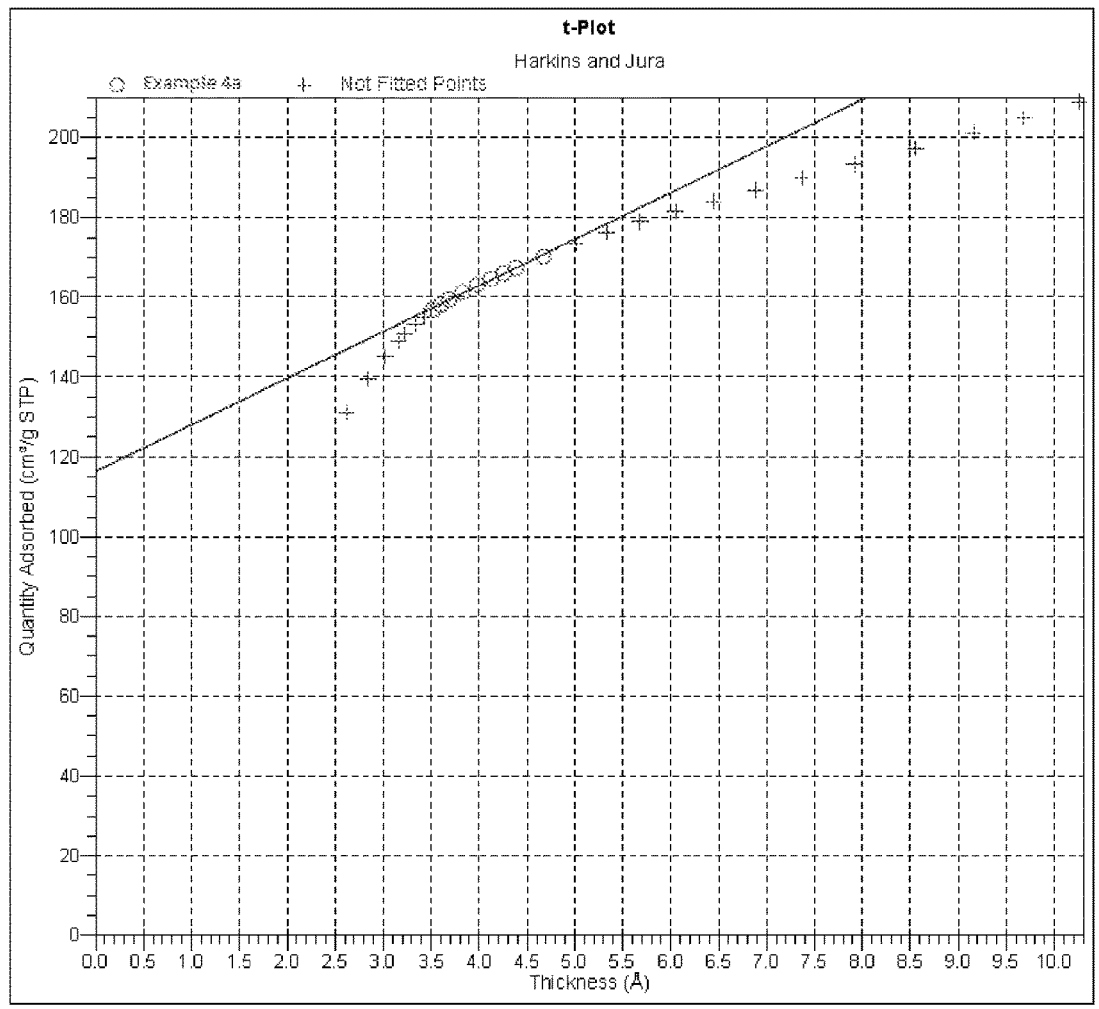
FIG. 12 shows x-ray diffraction spectra of the fourth example extrudate after acid treatment.

The t-plot of example 4a can be found in FIG. 12.

Figure 13:
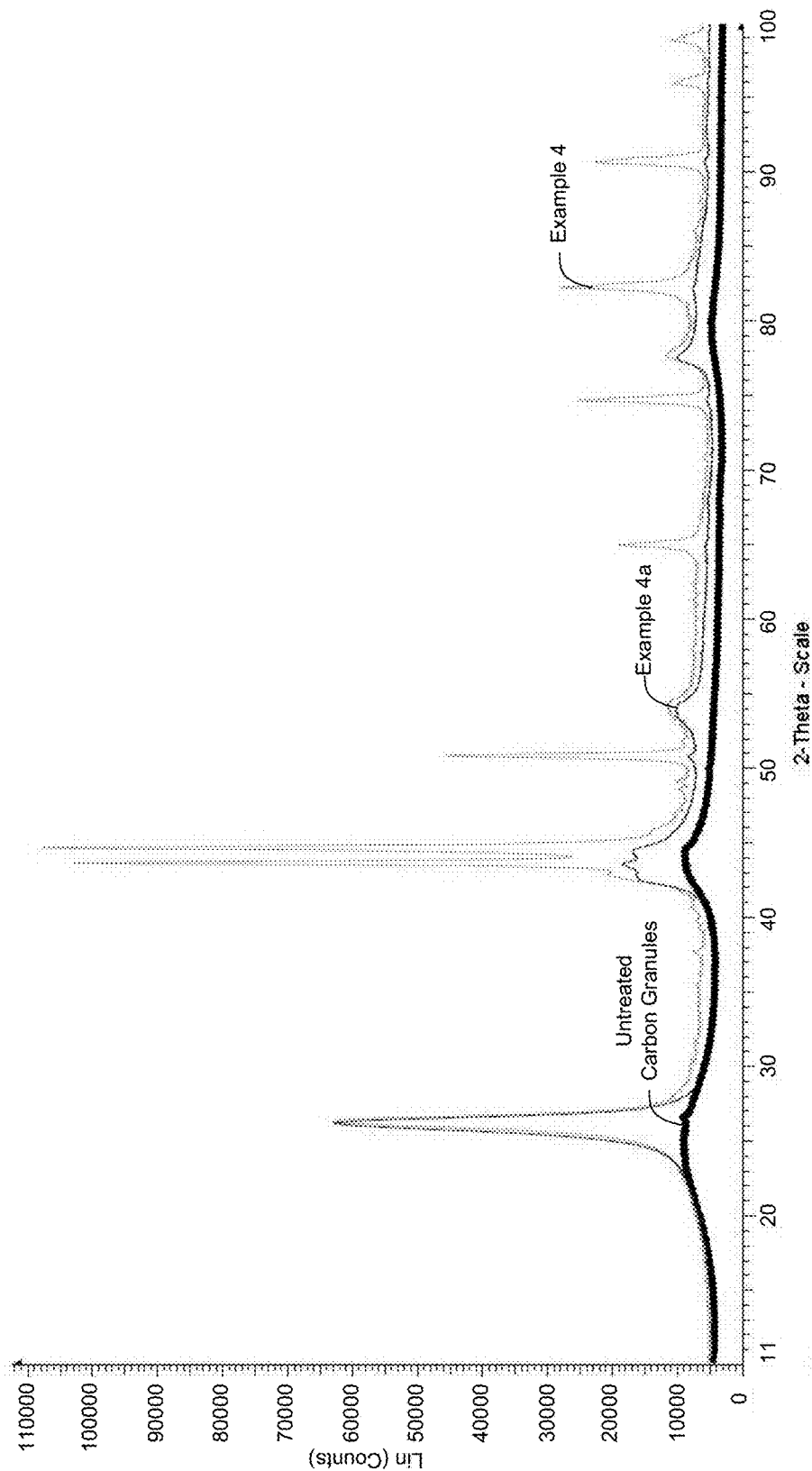
FIG. 13 shows x-ray diffraction of various example extrudates.

FIG. 13 shows the XRD spectra of examples 1, 4 and 4a (see FIG. 12, thick black, grey and thin black lines, respectively).

The XRD spectra of examples 4 and 4a shows that iron can be removed from the Fe-containing granules (example 4) by acid treatment, without effecting the graphite content (see FIG. 13, peak at 26 2-theta scale). Elemental analysis also confirmed that >90 wt. % of the iron was removed by the acid treatment (see tables 4 and 4a). Similarly to example 2a, the pore structure of the acid treated granules (example 4a) did not change significantly from that of the Fe-containing granules (example 4). The BET-surface area of the acid treated granules (example 4a) was found to significantly increase in comparison to the Fe-containing granules (example 4).

Example 5

Ferric(III) Ammonium Citrate/ Impregnation/800° C./3 h

Ferromagnetic carbon bodies according to the invention were prepared by spraying 5.1 ml of an iron(III) ammonium citrate solution (300.3 g ammonium iron(III) citrate solved in 250 g demiwater) over 25.1 g of the activated carbon extrudates (JEC carbon 1.8 mm SHIRASAGI C2×8/12 coconut-shell based pelletized activated carbon) with a spray bottle. The samples were dried for 45 min in a stove at 110° C. under ambient conditions (pressure of about 760 mm Hg). Subsequently 5.5 mL of the iron(III) ammonium citrate solution was sprayed over the carbon extrudates. The samples were dried overnight in a stove at 110° C. under ambient conditions. Loose particles were subsequently removed by sieving. Afterwards, the impregnated spheres were pyrolyzed by thermal treatment in a stagnant nitrogen gas atmosphere in a quartz tube reactor (Thermolyne 21100 furnace). The heating rate was 5° C./min and the spheres were kept at 800° C. for 3 h.

Figure 14:
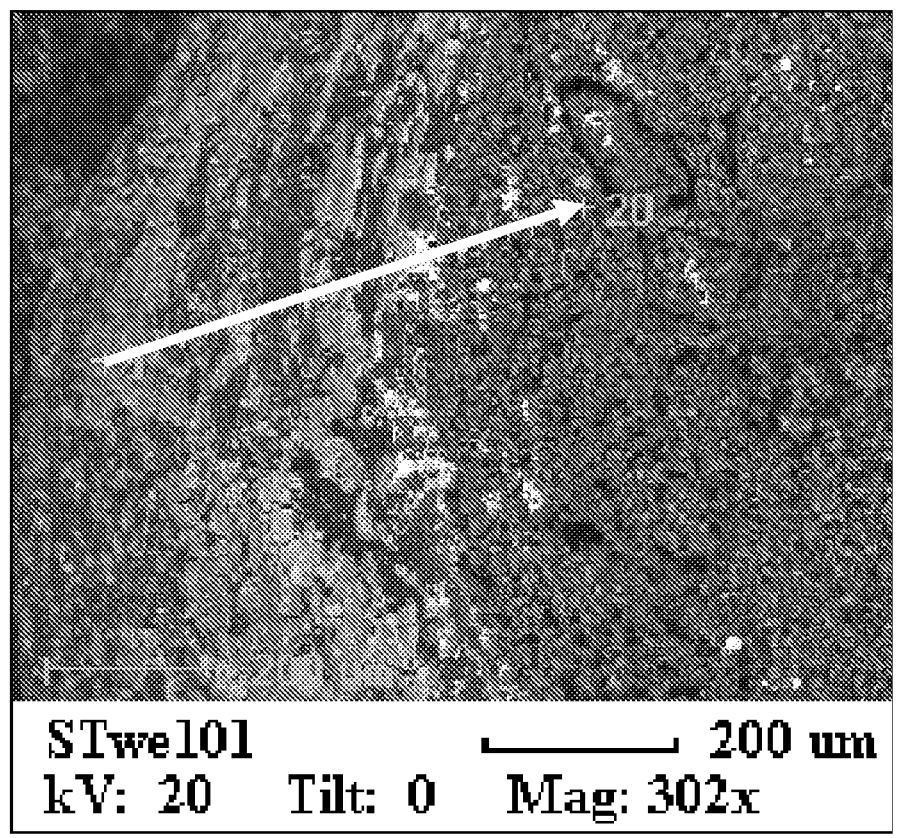
FIG. 14 shows a back-scattered image of a first ferromagnetic carbon body using a scanning electron microscope.
Figure 15:
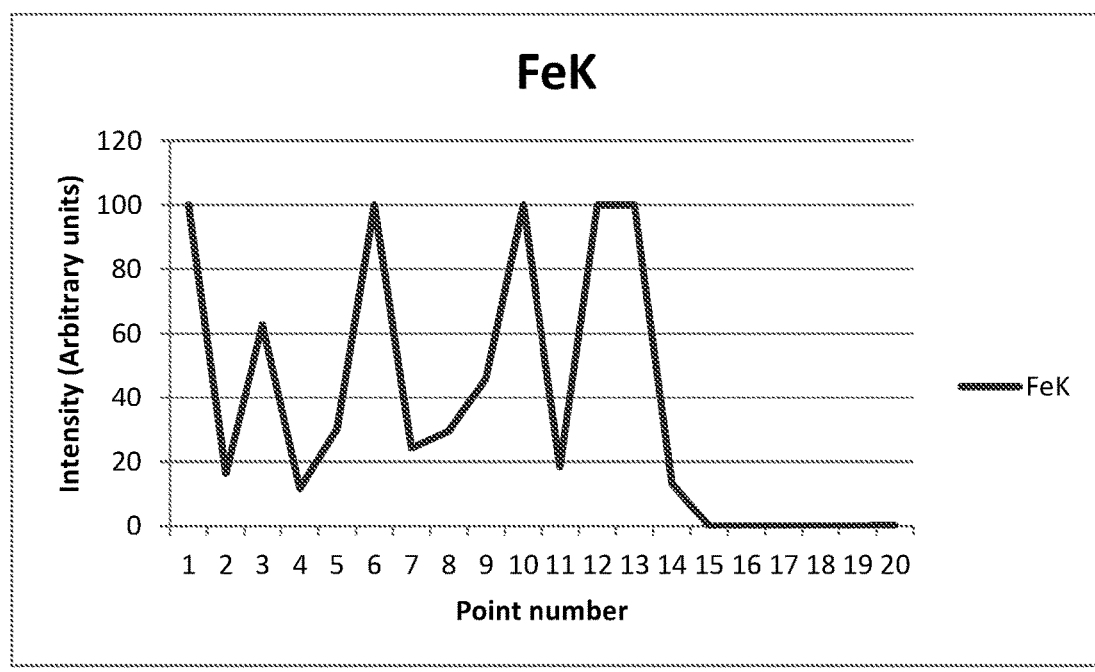
FIG. 15 shows an energy-dispersive X-ray elemental analysis of the first ferromagnetic carbon body.

FIG. 14 shows a back-scattered image taken with a Philips XL30 SFEG scanning electron microscope (SEM) using an electron beam of 20 kV of a cross-section of a ferromagnetic carbon body produced. FIG. 15 shows an energy-dispersive X-ray (EDX) elemental analysis along the arrow indicated in FIG. 14 and confirms that the iron particles are present only at the external edge of the ferromagnetic carbon body.

Example 6

Ferric(III) Ammonium Citrate/ Immersion/800° C./3 h 25 g of the activated carbon extrudates (JEC carbon 1.8 mm SHIRASAGI C2×8/12 coconut-shell based pelletized activated carbon) were immersed for 1 min in 200 mL of an iron(III) ammonium citrate solution (300.3 g iron(III) ammonium citrate solved in 250 g demiwater). The samples were drained and padded dry. The samples were dried overnight in a stove at 110° C. under ambient conditions (pressure of about 760 mm Hg). Loose particles were subsequently removed by sieving. Subsequently, the impregnated spheres were pyrolyzed by thermal treatment in a stagnant nitrogen gas atmosphere in a quartz tube reactor (Thermolyne 21100 furnace). The heating rate was 5° C./min and the spheres were kept at 800° C. for 3 h.

Figure 16:
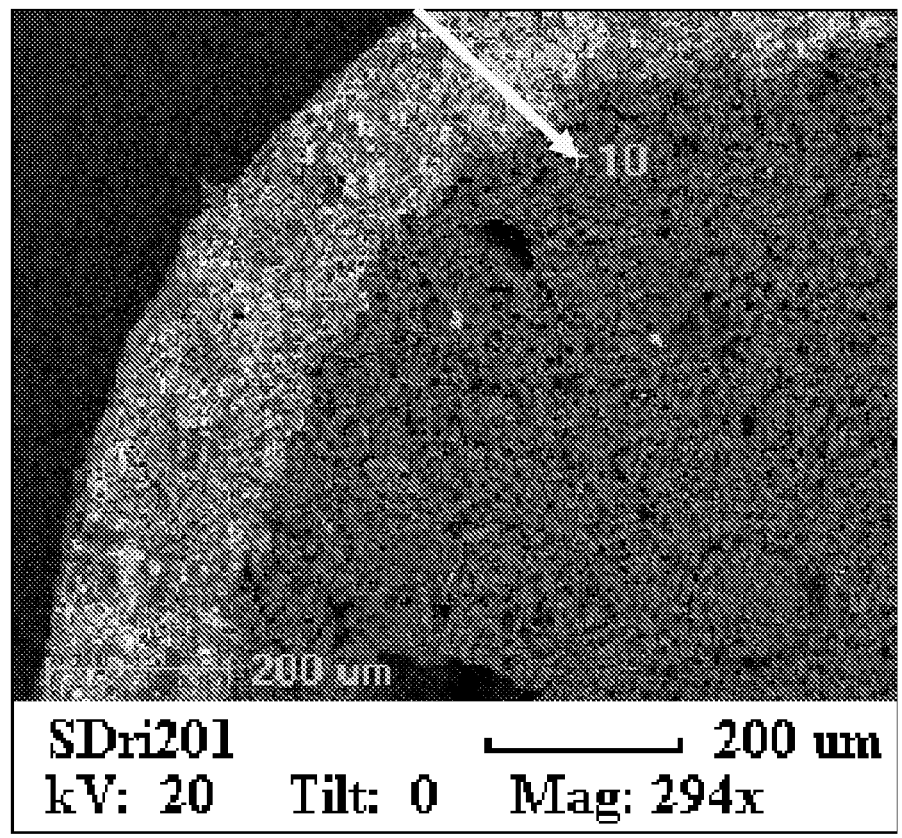
FIG. 16 shows a back-scattered image of a second ferromagnetic carbon body using a scanning electron microscope.
Figure 17:
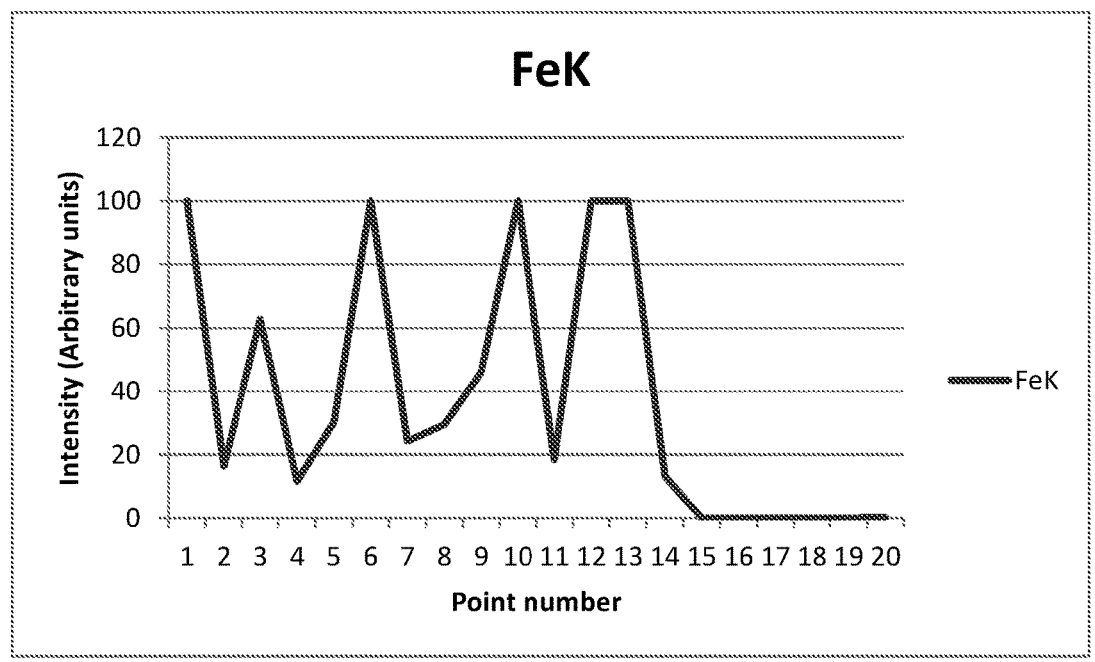
FIG. 17 shows an energy-dispersive X-ray elemental analysis of the second ferromagnetic carbon body.

FIG. 16 shows an back-scattered SEM image taken with a Philips XL30 SFEG SEM using an electron beam of 20 kV of a cross-section of a ferromagnetic carbon body produced. FIG. 17 shows EDX elemental analysis along the arrow indicated in FIG. 16 and confirms that the iron particles are present only at the external edge of the ferromagnetic carbon body.

The invention claimed is:

1. A ferromagnetic carbon body comprising a partly graphitized activated carbon; and metal particles of at least one ferromagnetic metal; wherein the ferromagnetic carbon body has a size from 100 nm to 20 mm, a BET surface area of between 200 and 1000 $m^2/g$, a total pore volume of between 0.1 and 1 ml/g, and an average pore diameter of between 2 and 10 nm.

2. The ferromagnetic carbon body of claim 1, wherein the at least one ferromagnetic metal is selected from the group consisting of iron, nickel, cobalt metals, cobalt metal alloys, or a combination thereof; and
wherein the ferromagnetic carbon body comprises 10-90 wt. % graphitic carbon.

3. The ferromagnetic carbon body of claim 2, wherein the ferromagnetic carbon body comprises 20-80 wt. % graphitic carbon.

4. The ferromagnetic carbon body of claim 2, wherein the ferromagnetic carbon body comprises 25-70 wt. % graphitic carbon.

5. The ferromagnetic carbon body of claim 2, wherein the ferromagnetic carbon body comprises 30-60 wt. % graphitic carbon.

6. The ferromagnetic carbon body of claim 1, wherein the metal particles are completely encapsulated by graphitic carbon.

7. The ferromagnetic carbon body of claim 1 further comprising additional particles of a metal, metal oxide, or a combination thereof.

8. The ferromagnetic carbon body of claim 1 further comprising a polymer.

9. The ferromagnetic carbon body of claim 1, wherein the ferromagnetic carbon body is provided with carbon nanotubes, carbon nanofibres, or a combination thereof.

10. A process for the production of a ferromagnetic carbon body according to claim 1, comprising:
impregnating activated carbon with an aqueous solution of a non-volatile metal compound;
drying the impregnated activated carbon;
pyrolyzing the dried impregnated activated carbon under an inert atmosphere; and
reducing the metal compound to a corresponding metal.

11. The process of claim 10, wherein the metal compound is a precursor of a ferromagnetic metal, a ferromagnetic metal alloy, or a combination thereof.

12. The process of claim 11, wherein the metal compound is iron(III) nitrate or iron(III) ammonium citrate.

13. A process for the production of a carbon body comprising partly graphitized activated carbon comprising:
contacting the ferromagnetic carbon body of claim 1 with an acid;
dissolving the metal particles;
rinsing the acid treated ferromagnetic carbon body with a liquid; and
removing the dissolved metal particles.

14. A catalyst suitable for producing olefins by hydrogenating carbon monoxide, wherein said catalyst comprises a ferromagnetic carbon body according to claim 1.

15. A process for the production of a ferromagnetic carbon body comprising:
mixing activated carbon powder with a non-volatile metal compound powder;
shaping the resulting mixed powder into a body;
pyrolyzing the shaped body under an inert atmosphere; and
reducing the metal compound to a corresponding metal;
wherein the ferromagnetic carbon body has a size between 100 nm to 20 mm.

16. The process of claim 15, wherein the ferromagnetic carbon body is contacted with a gas flow comprising hydrogen and a carbon containing compound at a temperature greater than 800° C.

17. The process of claim 15, wherein a polymer is adsorbed onto the graphitic surface of the ferromagnetic carbon body.

18. The process of claim 15, wherein the ferromagnetic carbon body is loaded with a metal, a metal oxide, or a combination thereof.

19. The process of claim 18, wherein said ferromagnetic carbon body comprises ferromagnetic metal particles completely encapsulated by graphitic carbon layers.

20. A ferromagnetic carbon body comprising partly graphitized activated carbon and metal particles of at least one ferromagnetic metal;
wherein the ferromagnetic carbon body has a size from 100 nm to 20 mm, a BET surface area of between 200 and 1000 $m^2/g$, a total pore volume between 0.1 and 1 ml/g, and an average pore diameter of between 2 and 10 nm;
obtained by the process according to claim 15.

21. The process of claim 15, wherein the metal compound is a precursor of a ferromagnetic metal, a ferromagnetic metal alloy, or a combination thereof.

22. The process of claim 21, wherein the metal compound is iron(III) nitrate or iron(III) ammonium citrate.

* * * * *